United States Patent
Salkeld

(10) Patent No.: US 9,139,311 B2
(45) Date of Patent: Sep. 22, 2015

(54) REUSABLE GLOBAL LAUNCHER

(71) Applicant: Robert Salkeld, Santa Fe, NM (US)

(72) Inventor: Robert Salkeld, Santa Fe, NM (US)

( * ) Notice: Subject to any disclaimer, the term of this patent is extended or adjusted under 35 U.S.C. 154(b) by 101 days.

(21) Appl. No.: 13/944,149

(22) Filed: Jul. 17, 2013

(65) Prior Publication Data

US 2014/0263842 A1 Sep. 18, 2014

Related U.S. Application Data

(60) Provisional application No. 61/793,441, filed on Mar. 15, 2013.

(51) Int. Cl.
*B64G 1/00* (2006.01)
*B64G 1/10* (2006.01)
*B64G 1/14* (2006.01)

(52) U.S. Cl.
CPC *B64G 1/14* (2013.01); *B64G 1/002* (2013.01); *B64G 1/005* (2013.01)

(58) Field of Classification Search
CPC ............. B64G 1/005; B64G 1/10; B64G 1/14
USPC ........... 244/2, 158.9, 159.3, 171.3, 171.4, 63, 244/171.9, 173.3
See application file for complete search history.

(56) References Cited

U.S. PATENT DOCUMENTS

| | | | |
|---|---|---|---|
| 3,702,688 A * | 11/1972 | Faget | 244/159.3 |
| 3,910,037 A | 10/1975 | Salkeld | |
| 3,955,784 A | 5/1976 | Salkeld | |
| 4,220,001 A | 9/1980 | Beichel | |
| 4,265,416 A * | 5/1981 | Jackson et al. | 244/2 |
| 4,802,639 A * | 2/1989 | Hardy et al. | 244/2 |
| 5,090,642 A | 2/1992 | Salkeld | |
| 5,397,082 A | 3/1995 | Scott | |
| 5,456,424 A * | 10/1995 | Palmer | 244/2 |
| 5,681,011 A | 10/1997 | Frazier | |
| 6,029,928 A | 2/2000 | Kelly | |
| 6,059,235 A | 5/2000 | Meissinger et al. | |
| 6,068,211 A * | 5/2000 | Toliver et al. | 244/2 |
| 6,193,187 B1 * | 2/2001 | Scott et al. | 244/2 |
| 6,446,905 B1 | 9/2002 | Campbell et al. | |
| 6,557,803 B2 | 5/2003 | Carpenter et al. | |

(Continued)

OTHER PUBLICATIONS

"Virgin Atlantic GlobalFlyer", Wikipedia, <http://en.wikipedia.org/wiki/Virgin_Atlantic_GlobalFlyer>.*

(Continued)

*Primary Examiner* — Tien Dinh
*Assistant Examiner* — Michael Wang
(74) *Attorney, Agent, or Firm* — Philip D. Askenazy; Peacock Myers, P.C.

(57) ABSTRACT

A reusable unmanned single-stage boost-glide suborbital Earth launcher, able to propel large or smaller payloads from Earth surface or from air launch, to a nearly Earth-orbital condition, then glide circum-globally to horizontal airstrip landing at its launch site or similar circum-global recovery site. The payload, using its own propulsion, is thus enabled to complete insertion into low-Earth-orbit (LEO) or destinations beyond LEO. This technically feasible capability, beyond conferring economic benefits of reusability and maneuverability, can be adapted to increase payload by adding drop tanks, or solid or liquid "strap on" boosters, and might eventually be modified and evolved to perform manned aerospace missions, as well as single stage to orbit (SSTO) missions.

17 Claims, 17 Drawing Sheets

(56) References Cited

U.S. PATENT DOCUMENTS

| | | | |
|---|---|---|---|
| 6,612,522 B1 * | 9/2003 | Aldrin et al. | 244/2 |
| 6,666,409 B2 | 12/2003 | Carpenter et al. | |
| 6,827,313 B1 | 12/2004 | Aldrin | |
| 6,913,224 B2 | 7/2005 | Johansen | |
| 6,932,302 B2 * | 8/2005 | Martin | 455/12.1 |
| 7,131,613 B2 | 11/2006 | Kelly | |
| 7,458,544 B1 * | 12/2008 | Sarigul-Klijn et al. | 244/137.4 |
| 8,528,853 B2 * | 9/2013 | Luther | 244/2 |
| 8,534,598 B2 | 9/2013 | Salkeld | |
| 8,800,934 B1 * | 8/2014 | Straw | 244/159.3 |
| 2003/0080241 A1 * | 5/2003 | Shpigler et al. | 244/2 |
| 2007/0136032 A1 | 6/2007 | Leland et al. | |
| 2009/0140101 A1 * | 6/2009 | Salkeld | 244/159.3 |
| 2014/0014779 A1 | 1/2014 | Salkeld | |

OTHER PUBLICATIONS

"Lift-to-drag ratio", Wikipedia, <http://en.wikipedia.org/wiki/Lift-to-drag_ratio>.*

"Hypersonic Flight", McGraw-Hill Encyclopedia of Science & Technology, vol. 8, 11th Edition, McGraw-Hill, 2005, 814-815.

"Manned Space Flight: Apollo", NASA Facts NF-23, vol. IV, No. 7, National Aeronautics and Space Administration, 1967, 1-16.

"Millenium Engine", Aviation Week & Space Technology, Mar. 19, 2012, 18.

Czysz, P. A. et al., "Perspective of Launch Vehicle Size and Weight Based on Propulsion System Concept", 53rd International Astronautical Congress, The World Space Congress, Houston, Texas, Oct. 2002.

Lepsch, Jr., Roger A., "Dual-Fuel Propulsion in Single-Stage Advanced Manned Launch System Vehicle", Journal of Spacecraft and Rockets, vol. 32, No. 3, May 6, 1995, 417-425.

Milstein, Michael, "Super Duper Jumbo", Air and Space Smithsonian, vol. 21, No. 2, Jul. 2006, 23-27.

Morring, Jr., Frank, "Kick Stage", Aviation Week & Space Technology, Jan. 16, 2012, 24-25.

Morring, Jr., Frank, "Sample Return", Aviation Week & Space Technology, Jun. 13, 2011, 19.

Salkeld, R., "Geolunar Shuttle: Earth-Based and Moon-Based", 53rd International Astronautical Congress, The World Space Congress 2002, Houston, Texas, Oct. 10, 2002, 1-11.

Salkeld, R. et al., "Mixed-Mode Propulsion Systems for Full Capability Space Tugs", 21st AAS Annual Meeting, Space Shuttle Missions of the 80's, Denver, CO., Aug. 1975, 1-15.

Salkeld, R., "Space Rescue and Other Space Operations from Existing Airstrips", XXVII Congress, International Astronautical Federation, Anaheim, California, International Academy of Astronautics, Paris, France, Oct. 10-17, 1976.

Salkeld, Robert et al., "A Reusable Space Vehicle for Direct Descent from High Orbits", Aeronautics and Astronautics, American Institute of Aeronautics and Astronautics, Apr. 1981, 46-47, 63.

Salkeld, Robert, "Geolunar Shuttle as Upper Stage for Heavy Earth Launchers", 56th International Astronautical Congress, Fukuoka, Japan, 2005.

Salkeld, Robert, "Geolunar Shuttle: Earth Launch Options; Growth Using Lunar Propellants", 52nd International Astronautical Congress, Toulouse France, International Astronautical Federaion, Paris, France, Oct. 1-5, 2001, 1-10.

Salkeld, Robert, "Single-Stage Shuttles for Ground Launch and Air Launch", Astronautics & Aeronautics, Mar. 1974, 52-64.

Salkeld, Robert J., "Comparison of Separate and Integral Spacecraft", J. Spacecraft, vol. 6, No. 11, Nov. 1969, 1315-1316.

Salkeld, Robert J., "Multiple-based Air and Ground Launch for Inspection, Rescue and Other Space Missions", AIAA Journal of Spacecraft and Rockets, vol. 6, No. 12, Dec. 1969, 1448-1453.

Sanger, E. et al., "A Rocket Drive for Long Range Bombers", Deutsche Luftfahrtforschung UM 3538, Translated by M. Hamermesh, Radio Research Laboratory; Reproduced by Technical Information Branch, Buaer, Navy Department, Aug. 1944.

Slazer, Frank A. et al., "Delta IV Launch Vehicle Growth Options to Support NASA's Space Exploration Vision", 55th International Astronautical Congress, Vancouver, Canada, The Boeing Company, IAC-04-V.4.03, 2004.

Warwick, Graham, "Reusable Boost", Aviation Week & Space Technology, Apr. 19, 2010, 30-31.

\* cited by examiner

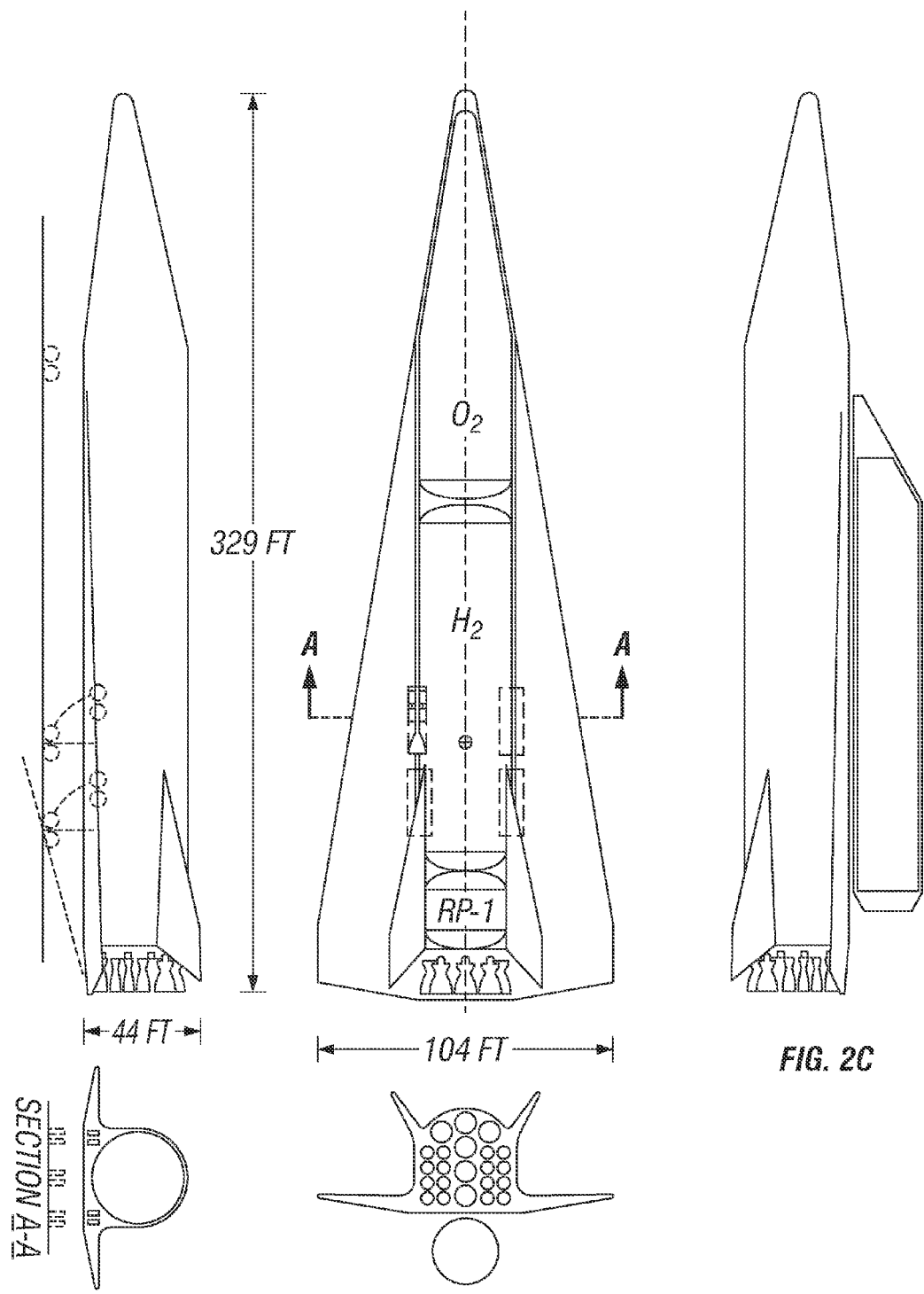

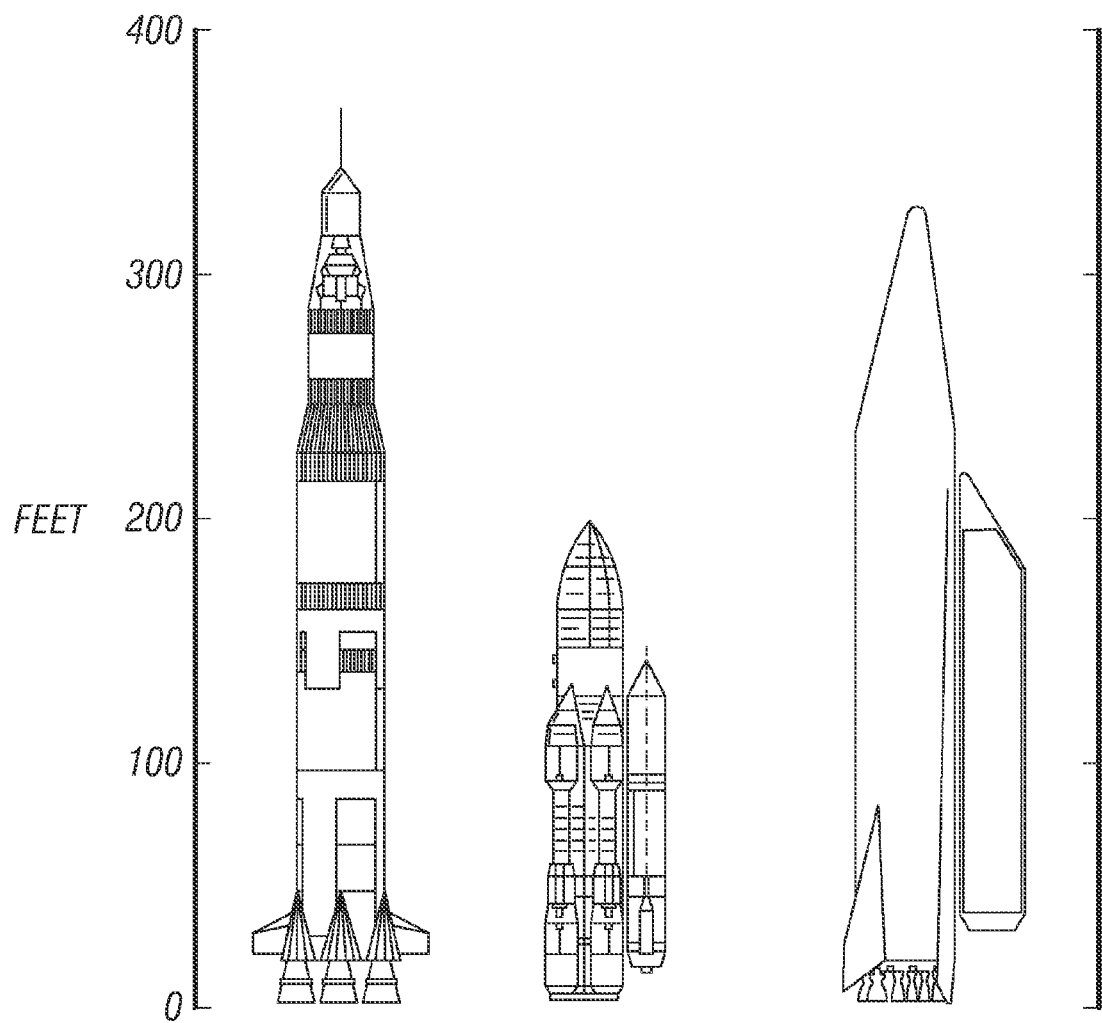
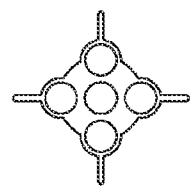
FIG. 5A
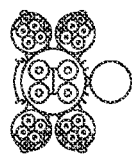
FIG. 5B
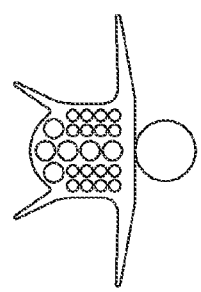
FIG. 5C

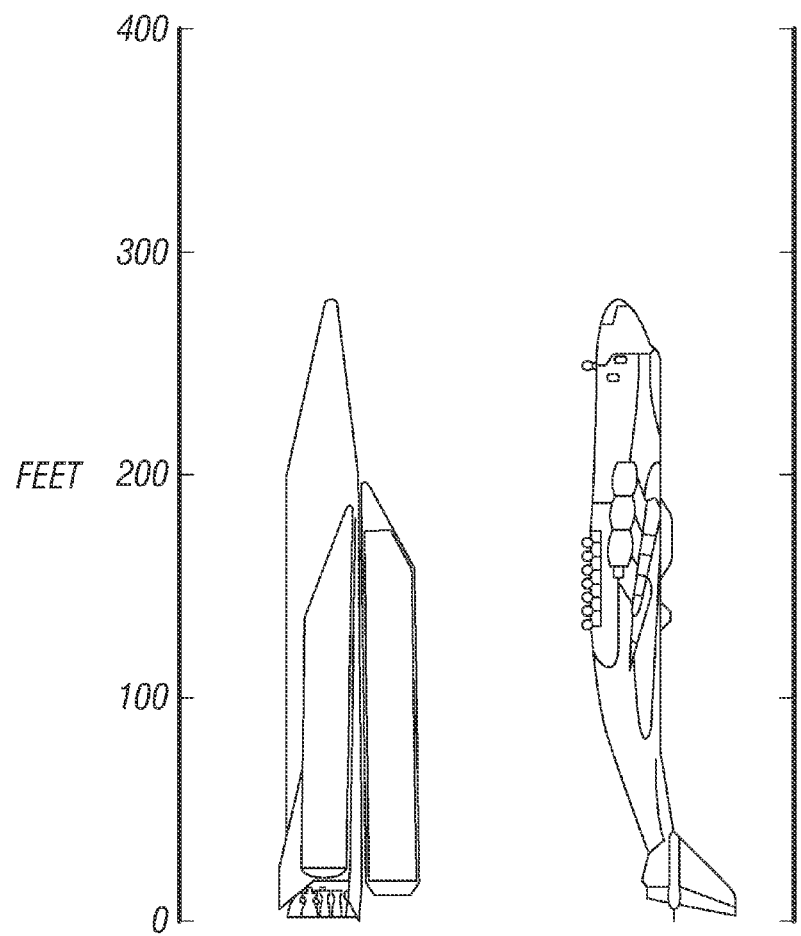
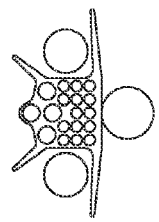
FIG. 5D
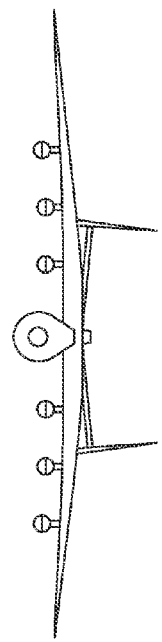
FIG. 5E

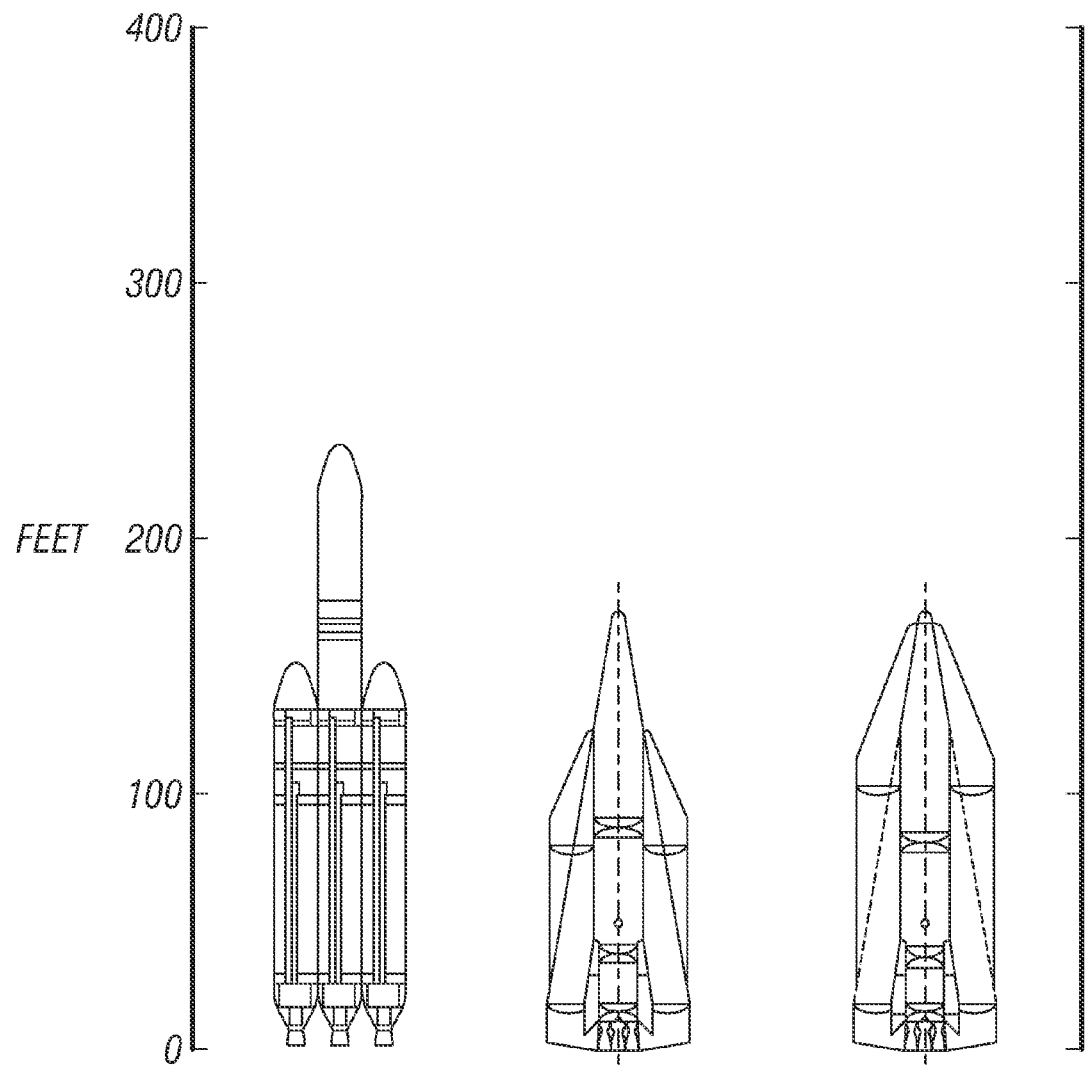
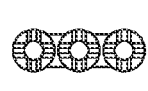
FIG. 6A
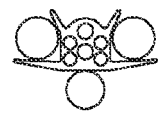
FIG. 6B
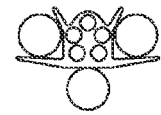
FIG. 6C

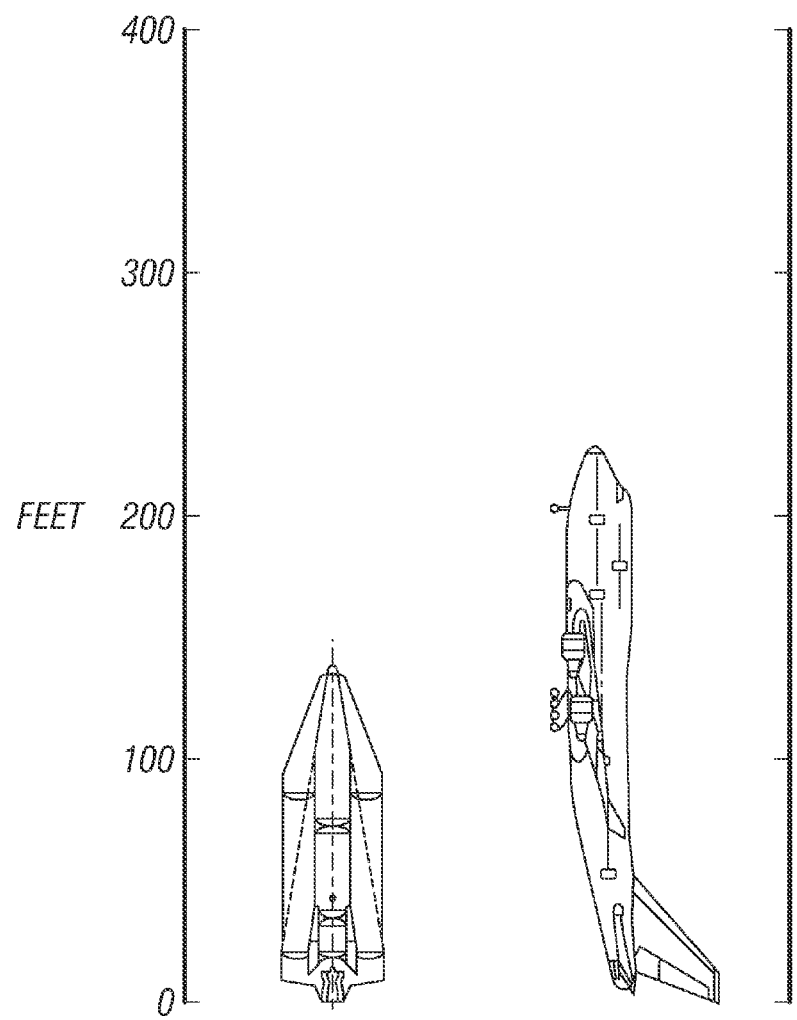
FIG. 6D
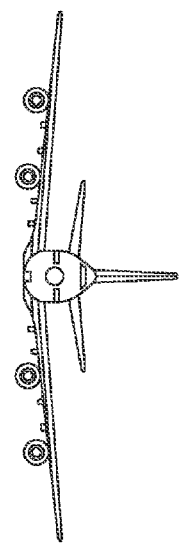
FIG. 6E

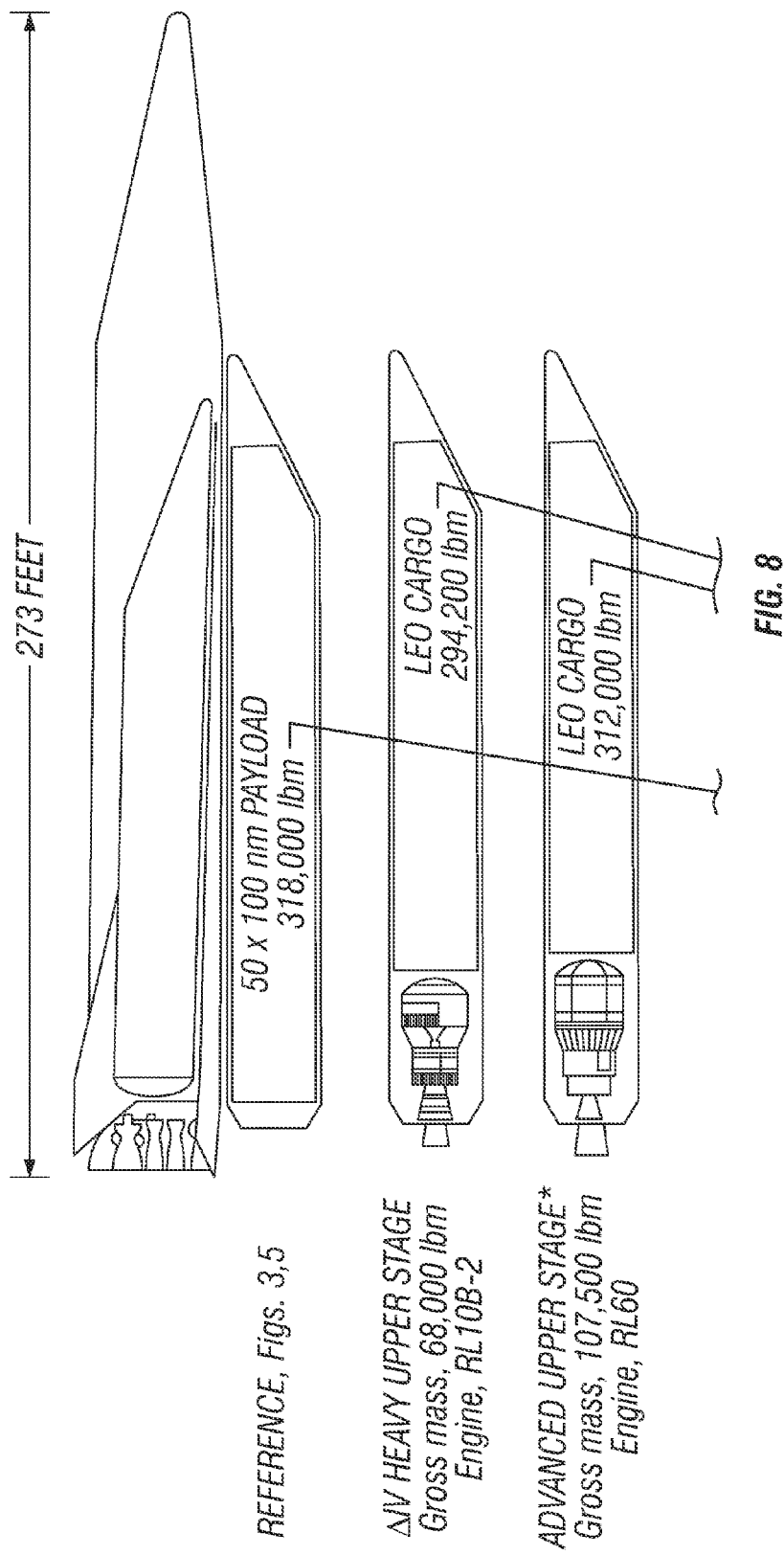

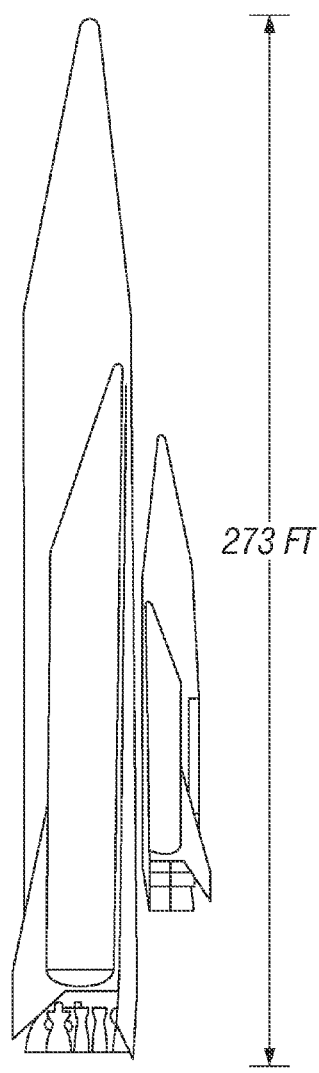
|←37 FT→|
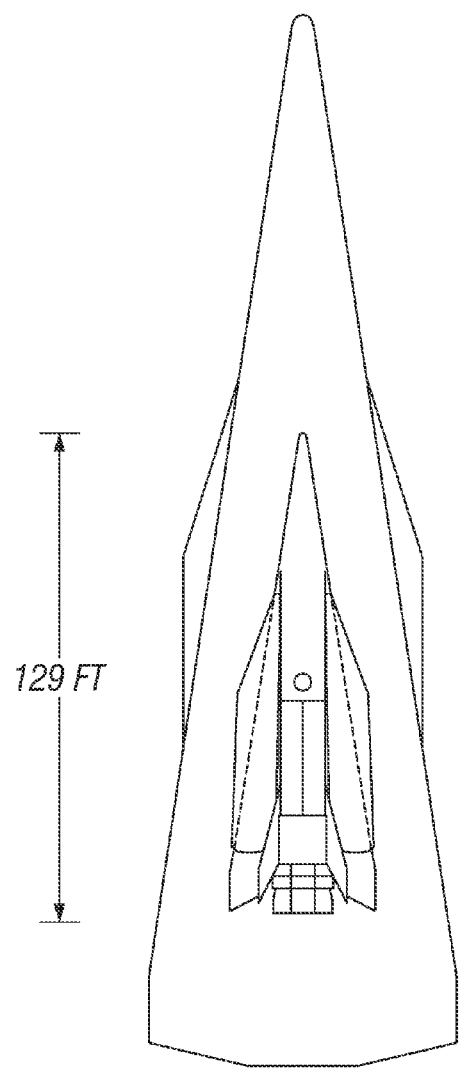
FIG. 9B    FIG. 9C
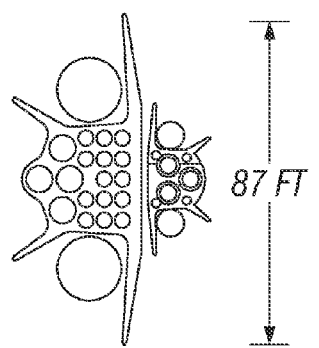
FIG. 9A (REFERENCE AIRCRAFT: AN-225)

(REFERENCE AIRCRAFT: AN-225)

REUSABLE GLOBAL LAUNCHER

CROSS-REFERENCE TO RELATED APPLICATIONS

This application claims priority to and the benefit of the filing of U.S. Provisional Patent Application Ser. No. 61/793,441, entitled "Reusable Global Launcher", filed on Mar. 15, 2013, the specification and claims of which are incorporated herein by reference.

BACKGROUND OF THE INVENTION

1. Field of the Invention (Technical Field)

Embodiments of the present invention are related to Earth or air launch reusable rocket vehicle systems.

2. Background of the Invention

Note that the following discussion refers to a number of publications and references. Discussion of such publications herein is given for more complete background of the scientific principles and is not to be construed as an admission that such publications are prior art for patentability determination purposes.

Previous designs for reusable rocket systems include: 1) Earth liftoff boost stages which execute short-range turn-around return to the launch site or a downrange site by ballistic, glide or powered flight with parachutes, vertical-touchdown or horizontal airstrip recovery; 2) Earth liftoff single-stage-to-orbit (SSTO) launchers to low-Earth-orbit (LEO) which return to any Earth site by ballistic, glide or powered flight with parachute, vertical-touchdown or horizontal airstrip recovery: 3) air-launch for any of the above. The SSTO option has long been dismissed as "too technologically risky" because of vehicle development dry weight uncertainty.

SUMMARY OF THE INVENTION

An embodiment of the present invention is a method for operating a launch vehicle, the method comprising the steps of launching a reusable launch vehicle; releasing an external vehicle payload from the vehicle at a velocity lower than orbital velocity; the vehicle subsequently performing global flight; and landing the vehicle. The vehicle is preferably unmanned. The landing step is optionally performed at the same location as the launch step. The launching step optionally comprises air launching. The vehicle preferably comprises sufficient aerodynamic glide capability to circle the Earth, preferably having an L/D ratio of greater than or equal to approximately 3. The vehicle optionally performs an aerodynamic dog-leg maneuver during ascent prior to the releasing step. The vehicle preferably comprises a rocket. The landing step preferably comprises a landing horizontally on an airstrip. The vehicle is preferably a single stage vehicle. The vehicle preferably comprises one or elements selected from the group consisting of cylindrical propellant tanks, expendable drop tanks which preferably supply fuel to the vehicle to increase its propulsion and/or thrust, no internal cargo bay, duel fuel propulsion, circular cross-section, dry wings, and extra engines. The method optionally further comprises the payload entering low earth orbit and/or destinations beyond low earth orbit.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings and the dimensions therein are only for the purpose of illustrating certain embodiments of the invention and are not to be construed as limiting the invention. In the drawings:

FIG. 2a is a side view of an embodiment of the reusable single-stage global launcher of the present invention in the horizontal landing configuration.

FIG. 2b is a top view of the embodiment of the reusable single-stage global launcher of the present invention shown in FIG. 2a with a payload container.

FIG. 2c is a side view of the embodiment of the reusable single-stage global launcher of the present invention shown in FIG. 2b.

FIG. 3c is a side view of the embodiment of the reusable single-stage global launcher of the present invention shown in FIG. 3b.

FIG. 4c is a side view of the embodiment of the reusable single-stage global launcher of the present invention shown in FIG. 4b.

FIG. 5 compares the sizes of various vehicles. FIG. 5a shows a Saturn V rocket. FIG. 5b shows an Energia SL-17. FIG. 5c shows the reusable global launcher of FIG. 2. FIG. 5d shows the reusable global launcher of FIG. 3. FIG. 5e shows AN-225 aircraft.

FIG. 6 compares the sizes of various vehicles. FIG. 6a shows a Delta IV Heavy launcher. FIG. 6b shows a 1½-stage vehicle with a 16.5 ft. main tank diameter and 2xRD-180 plus 2xSSME engines. FIG. 6c shows a 1½-stage vehicle with a 16.5 ft main tank diameter and 5xDF/DX engines. FIG. 6d shows a 1½-stage vehicle with a 12.5 ft. main tank diameter and 1 xRD-180 plus 1xSSME engines. FIG. 6e shows a 747-400 aircraft.

FIG. 9a is a side view of an embodiment of the reusable global launcher of the present invention as the Earth launch platform for a geolunar shuttle.

FIG. 9b is a top view of the geolunar shuttle shown in FIGS. 9a and 9c.

FIG. 9c is a top view of an embodiment of the reusable global launcher/geolunar shuttle combination shown in FIG. 9a.

FIG. 10b shows a reference AN-225 aircraft for size comparison with the aircraft of FIG. 10a.

FIG. 10c is a detail of the embodiment of the reusable global launcher shown in FIG. 10a.

FIG. 11b is a rear view of the vehicle shown in FIG. 11a.

FIG. 11c shows a reference AN-225 aircraft for size comparison with the aircraft of FIG. 11a.

DETAILED DESCRIPTION OF THE INVENTION

Figure 1:
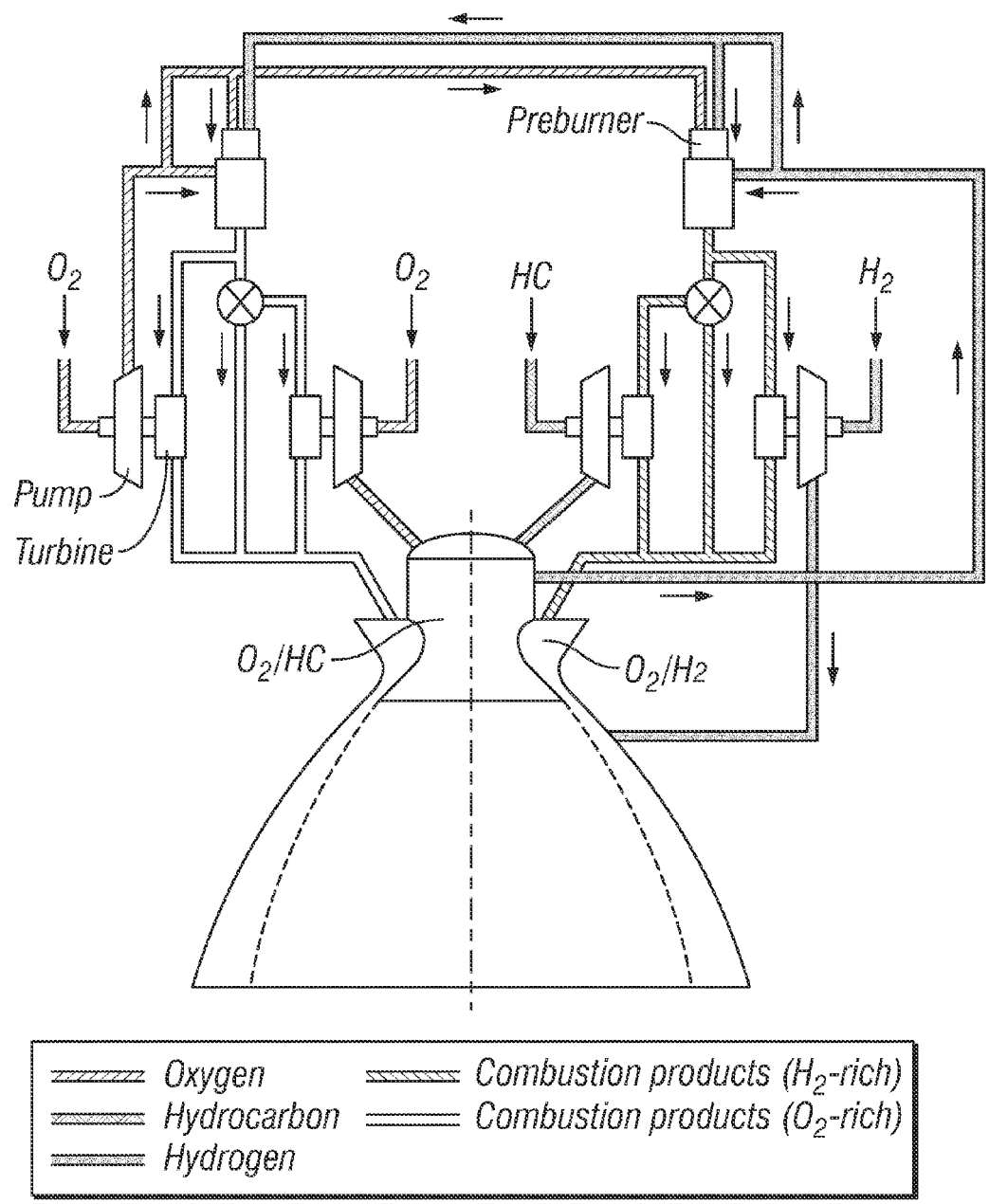
FIG. 1 shows a cycle schematic of a DF/DX example engine.

Embodiments of the present invention introduce the novel possibility of an unmanned reusable single-stage or 1½ stage global launcher, which may either be large or small enough to be air-launched, which can circle the Earth without attaining LEO, and glide to its launch or other Earth sites, by incorporating in its design, a high (approximately 3) hypersonic lift:drag (L/D) configuration. Such a configuration enables the launcher to return to its launch site or other sites from a suborbital or unsustainable Earth orbital (UEO) condition. As used throughout the specification and claims, the term "launch vehicle" or "launcher" means a vehicle that comprises a thrust to weight ratio to sufficient to lift off from the surface of the earth. As used throughout the specification and claims, the terms "unsustainable Earth orbit" or "UEO" mean a temporary Earth orbit with a perigee low enough that it soon decays. A 50×100 nautical mile orbit is often used as a reference UEO and will be used as an example herein. As used throughout the specification and claims, the term "global flight" means unpowered flight at least once around the Earth without starting from or attaining low Earth orbit, including but not limited to unpowered flight in a UEO. Global flight may optionally include gliding flight segments and/or ballistic flight segments, such as those occurring during skip-gliding. As used throughout the specification and claims, the term "skip-gliding" means flight that alternates between ballistic trajectory phases and phases in which aerodynamic forces are large enough to provide lift. Skip gliding has never been performed by a launch vehicle.

Embodiments of the present invention comprise (i) vehicle means and techniques for improved launch from Earth surface or airborne platforms, for a range of large or small manned or unmanned payloads, and including the economic benefits of launch vehicle recovery and reusability; (ii) a reusable Earth launch vehicle system having sufficient aerodynamic glide capability to complete at least one Earth circuit from a suborbital condition, to ensure recovery at its launch site or geographically similar site; (iii) a reusable Earth launch vehicle system having sufficient aerodynamic maneuvering capability to achieve large offsets during ascent and return, to increase flexibility and to complicate interception; and (iv) a reusable Earth launch vehicle system having sufficient aerodynamic glide and maneuvering capability to ensure at least "once-around" return and recovery, while accommodating expanded ranges of uncertainty in launch vehicle dry weight during development.

The above capability preferably confers the following new advantages: 1) by virtue of high hypersonic L/D configuration, the launcher can "dog-leg" its heading during ascent to offset location and azimuth of payload release as well as during return, to increase flexibility and to confuse attempted interception; 2) by virtue of its high L/D configuration, and consequent extended global glide range to ensure return to global recovery, overall aerodynamic performance can provide wider margin allowances for dry weight growth during vehicle development.

Embodiments of the present invention are directed to a launch system including process and apparatus for launch from Earth surface or airborne platforms, return from at least one Earth circuit recovery and reuse of a launch vehicle. A single-stage rocket propulsive vehicle is contemplated, which launches vertically or from an airborne platform, carries its payload to a suborbital or UEO release condition in any location, then can return by unpowered glide to complete at least one Earth circuit to its launch site or similar geographic location, thereby eliminating the typical requirement of having to turn around and fly back to the original launch site.

For simplicity leading to development, performance, operational and overall economic advantage, the reusable launcher is preferably unmanned, carries all main propellants in cylindrical tankage, and is capable of unpowered glide to horizontal airstrip landing. Accordingly, the launcher is preferably configured as "dart-shaped," having a cylindrical body and highly swept platform, with a sweep angle of approximately 81 degrees. Configuration and aerodynamic feature of this high-fineness vehicle are disclosed in U.S. Pat. No. 5,090,642. Such a vehicle having hypersonic L/D of approximately 3.0, injected horizontally at a re-entry velocity of 26,000 feet/second and altitude of 170,000 feet, could glide more than 11,500 nautical miles directly downrange and ±3,500 nautical miles crossrange, with horizontal airstrip recovery. Use of skip-gliding may extend and maximize these ranges.

Cylindrical tankage technology for this vehicle is established from: 1) Saturn V (33 feet); 2) NASA shuttle, (27.5 feet); 3) Delta IV (16.5 feet); Atlas V (12.5 feet). Propulsion technology for this vehicle is established from: 1) NASA space shuttle main engine (SSME/RS-25D); 2) Atlas V (RD-180); and projected from Russia (RD-701) and US (DF/DX). Typical specification for these developed and projected engines are presented in Table 1, summarized from "Dual-Fuel Propulsion in Single-Stage Advanced Manned Launch System Vehicle", Lepsch, R. A. Jr, et al, NASA Langley Research Center, AIAA Journal of Spacecraft and Rockets, Vol. 32, No. 3, May-June 1995. Though RD-180 and SSME with decades of successful flight experience may be considered obsolete, they do represent what can be achieved with demonstrated and foreseeable rocket engine technology.

TABLE 1

Rocket Engine Data

| ENGINE PARAMETER | SINGLE-FUEL (EXISTING) | | | DUAL FUEL (DUAL EXPANDER DESIGN) | |
|---|---|---|---|---|---|
| | RD-180 ($O_2$/KEROSENE) | SPACE SHUTTLE MAIN ENGINE (SSME-$O_2$/$H_2$) | | MODE I ($O_2$/PROPANE/$H_2$) | MODE 2 ($O_2$/$H_2$) |
| | | STD. ($\epsilon$ = 77.5) | MOD. ($\epsilon$ = 50) | | |
| Thrust, sea level, lbf | 859,800 | 391,900 | 420,000 | 666,700 | N/A |
| Thrust, vacuum, lbf | 934,800 | 488,300 | 482,200 | 750,000 | 235,100 |
| Specific impulse, sl., sec | 311.3 | 363.3 | 389.2 | 341 | N/A |
| Specific impulse, vac., sec | 337.8 | 452.7 | 447.0 | 383.7 | 462.9 |
| Chamber pressure, psia | 3,870 | 3,126 | 3,126 | 5,000/2,500 | 2,500 |
| Oxidizer: Fuel ratio | 2.6 | 6.0 | 6.0 | 3.2/6.0 | 6.0 |
| Nozzle expansion ratio, $\epsilon$ | 75.0 | 77.5 | 50.0 | 74.8/36.3 | 119.9 |
| Nozzle exit diem., ft | 4.91 | 7.88 | 6.33 | 6.36 | 6.36 |
| Engine length, ft | 11.8 | 14.67 | 13.00 | 10.7 | 10.7 |
| Engine dry mass, lbm | 11,905 | 7,203 | 6,780 | 8,127 | 8,127 |

Payload capacity of this single stage launcher can be increased by addition of expendable drop tanks and extra engines on the reusable core vehicle to provide required start thrust. Augmented with drop tanks, this version of the launcher will be termed "1½-stage".

For heavy versions of this vehicle, i.e. main tank diameter between approximately 27.5 feet and approximately 33.0 feet or greater, reduced payloads could be carried farther directly into LEO. Doing so, however, would impose requirements for additional on-board propulsion systems for orbital maneuvering and de-orbit for Earth return. Rather, jettisoning the container at suborbital altitude and velocity, and continuing from there with a separate upper "kick" stage would allow automatic Earth return of the launcher and deliver significantly increased cargo to LEO or far space transfer, because of the classical benefits of staging.

Embodiments of the invention preferably incorporate and consolidate performance, economic and operational advantages of five individual system concepts: 1) economic benefit of reusability; 2) simplicity of unmanned operation: 3) simplicity of circular cross-section tube-and-dry-wing design with no internal cargo bay; 4) aerothermodynamic benefit of high-fineness configuration; and 5) launch performance benefit of dual-fuel propulsion.

Embodiments of the present invention can incorporate single-fuel (oxygen-hydrogen) as well as dual-fuel (oxygen-hydrocarbon-hydrogen) propulsion. Comparison shows that in all cases, dual-fuel propulsion outperforms oxygen-hydrogen propulsion in terms of payload:gross weight and payload: dry weight ratios. The dual-fuel/dual-expander (DF/DX) engine example used herein is from Lepsch et al, adapted from R. Beichel, "Dual Fuel Dual Expander Rocket Engine", U.S. Pat. No. 4,220,001, descended from R. Salkeld, "Mixed-Mode Propulsion Aerospace Vehicles", U.S. Pat. No. 3,955, 784. That DF/DX example engine, a cycle schematic of which is shown in FIG. 1, combines hydrogen and hydrocarbon combustion within the same engine using coannular combustion chambers, which exhaust through a common nozzle. The outer chamber burns oxygen and hydrogen while the inner chamber burns oxygen and hydrocarbon fuel. As with the RD-701, the engine operates initially in a dual-fuel mode, where both hydrocarbon and hydrogen are burned, and then transitions to a single-fuel mode where only hydrogen is burned. During the single-fuel mode, the nozzle expansion ratio is effectively increased due to the reduction in throat area when the hydrocarbon chamber is inoperative. This results in high performance at altitude. A number of hydrocarbon propellant types have been investigated for use in this concept; subcooled liquid propane was selected for this study in view of results showing that lower vehicle empty weight can be achieved with this hydrocarbon fuel than with other common ones. A gas generator cycle is assumed for the hydrocarbon portion of the engine, and a staged combustion cycle is assumed for the hydrogen portion. Dual-fuel volume splits within the following core vehicles and drop tanks are thought to be near optimum; formal optimization would increase vehicle performance benefits of the dual-fuel vs. single-fuel options.

FIG. 2 depicts an embodiment of the reusable single-stage global launcher of the present invention with a main tank diameter of 33.0 feet using Saturn 5 main tankage technology heritage and flight-proven RD-180 and SSME propulsion technology. Parameters for this embodiment are listed in Table 2.

TABLE 2

| Vehicle Parameters | |
|---|---|
| Payload[a] | 302,000 |
| Cargo, lbm | 273,500 |
| Cargo container, lbm | 28,500 |
| Gross liftoff mass, lbm | 7,607,200 |
| Dry mass less engines, lbm[b] | 368,500 |
| Engines, lbm | |
| 8 × RD-180 | 95,240 |
| 6 × SSME($\epsilon$ = 77.5) | 43,218 |
| Re-entry planform loading, lbm/ft$^2$ | 228.2 |
| Cargo space, ft | 22 × 158 |
| Cargo density, lbm/ft$^3$ | 4.8 |
| Return glide downrange, n.mi. | (global) |
| Return glide crossrange, n.mi. | ±3,500 |

[a] 50 × 100 n.mi, 28.7°,

[b] incl. 15% margin

Figure 3A:
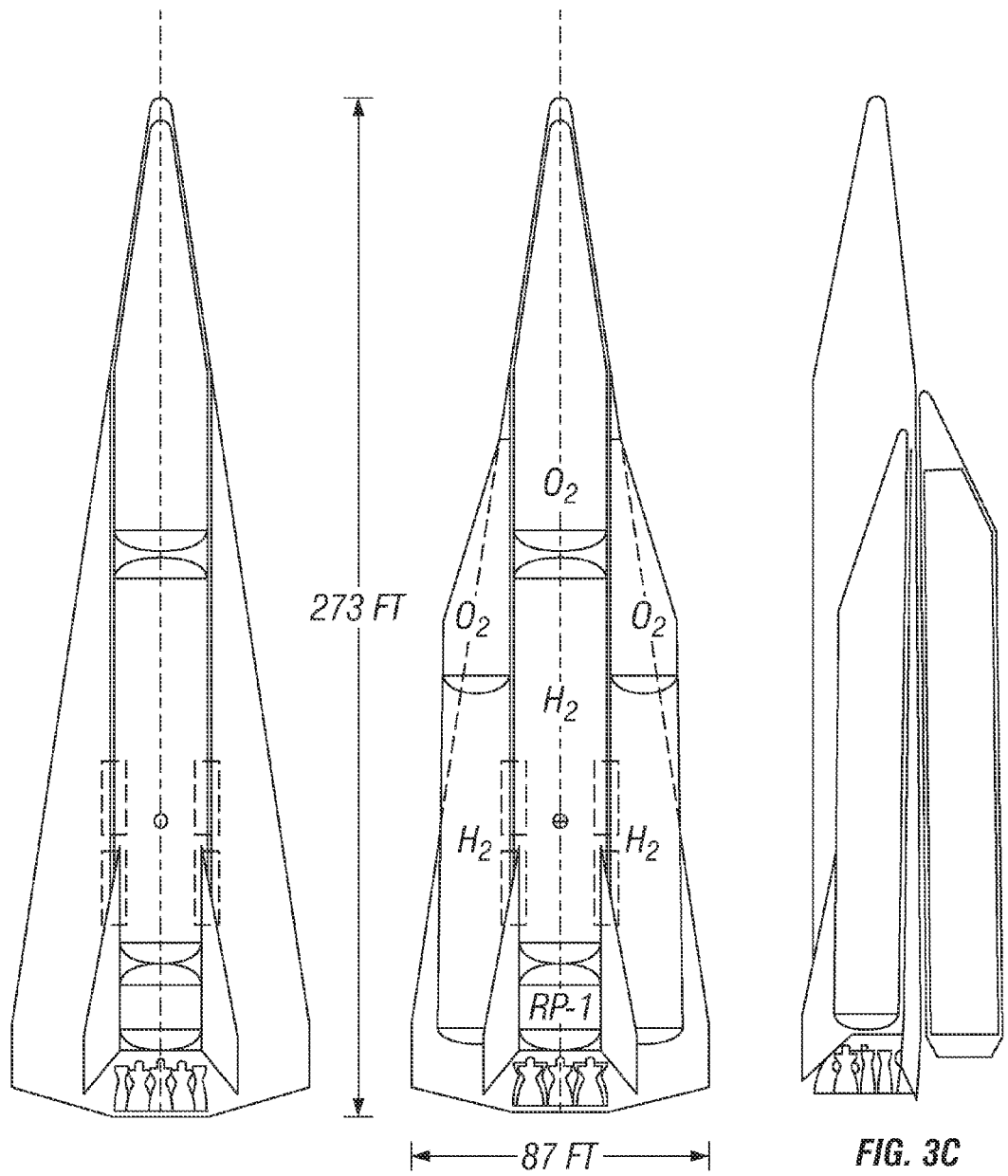
FIG. 3a is a top view of another embodiment of the reusable single-stage global launcher of the present invention with a single payload container.
Figure 3B:
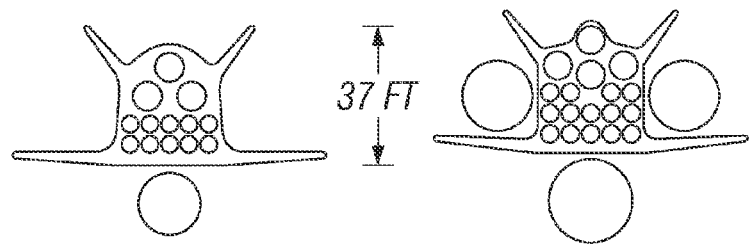
FIG. 3b is a top view of another embodiment of the reusable single-stage global launcher of the present invention with a single payload container and two external fuel tanks.

FIG. 3 depicts an embodiment of the reusable global launcher of the present invention with a main tank diameter of 27.5 feet using NASA shuttle external tankage technology heritage and flight-proven RD-180 and SSME propulsion technology. At this tank diameter, the designated high-pressure propulsion can provide the required single-stage liftoff thrust without occupying all of the available vehicle base area. Therefore, additional engines and external propellant drop tanks can be added to result in a heavier 1½-stage design, with payload/cargo increase of about 100 percent. Vehicle parameters for this embodiment are listed in Table 3.

TABLE 3

| VEHICLE PARAMETER | SINGLE STAGE | 1½ - STAGE CORE | DROP TANKS (2) |
|---|---|---|---|
| Payload[a] | 158,000 | 318,000 | — |
| Cargo, lbm | 143,100 | 294,200 | — |
| Cargo container, lbm | 14,900 | 23,800 | — |
| Gross liftoff mass, lbm | 4,515,000 | 4,726,000 | 1,561,400 |
| Dry mass less engines, lbm[b] | 242,190 | 260,900 | 62,900 |
| Engines, lbm | | | |
| 5 (SS) or 7 (1.5 S) × RD = 180 | 59,525 | 83,335 | — |
| 3 (SS) or 4 (1.5 S) × SSME ($\epsilon$ = 77.5) | 21,609 | 28,812 | — |
| Re-entry planform loading, lbm/ft² | 26.3 | 30.2 | — |
| Cargo space, ft | 17 × 122 | 21 × 155 | — |

TABLE 3-continued

| VEHICLE PARAMETER | SINGLE STAGE | 1½ - STAGE CORE | DROP TANKS (2) |
|---|---|---|---|
| Cargo density, lbm/ft³ | 5.5 | 5.8 | — |
| Return glide downrange, n.mi. | (global) | (global) | — |
| Return glide crossrange, n.mi. | ±3,500 | ±3,500 | — |

[a]50 × 100 n.mi.; 28.7°,
[b]incl. 15% margin

Figure 4A:
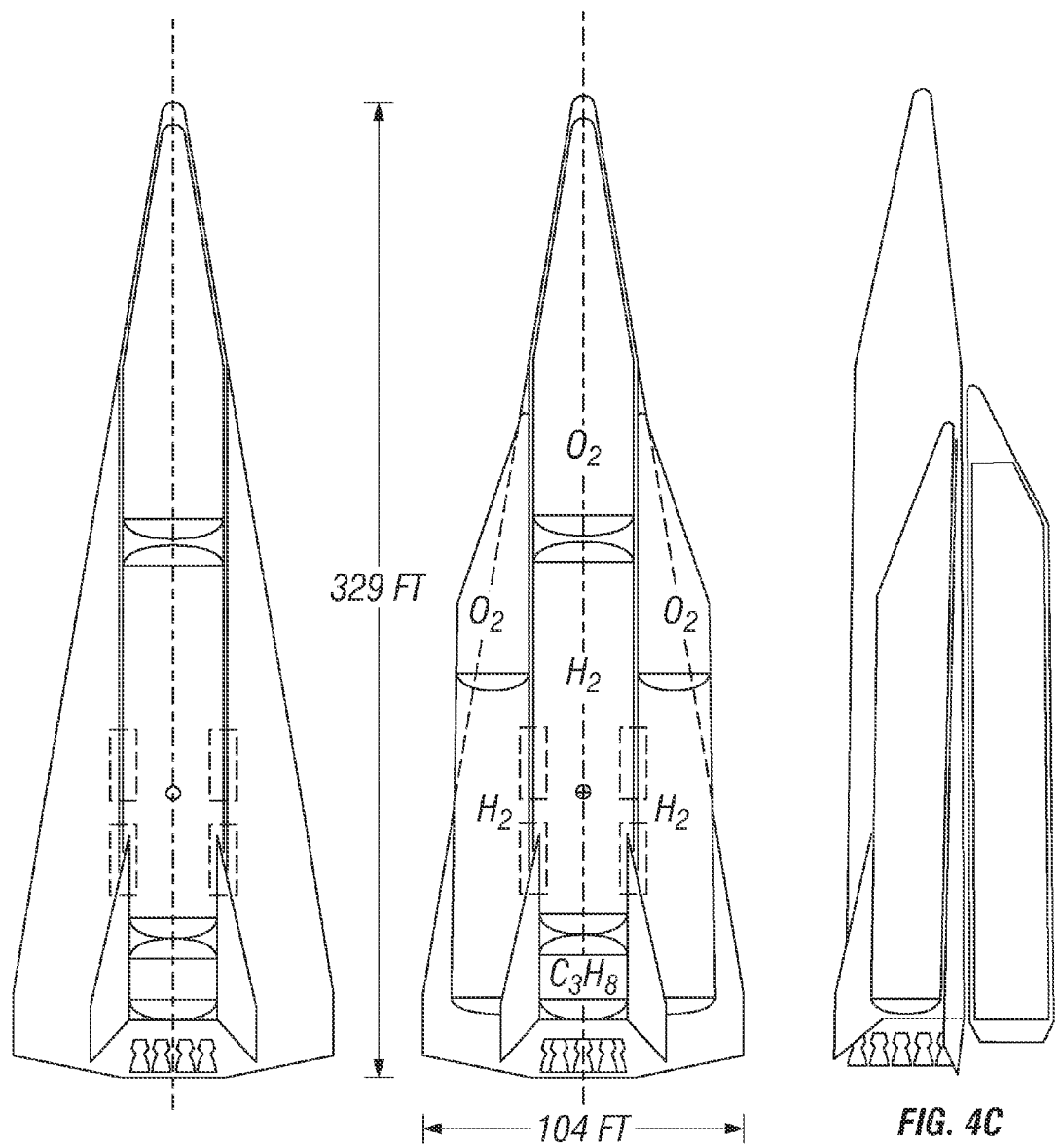
FIG. 4a is a top view of another embodiment of the reusable single-stage global launcher of the present invention with a single payload container.
Figure 4B:
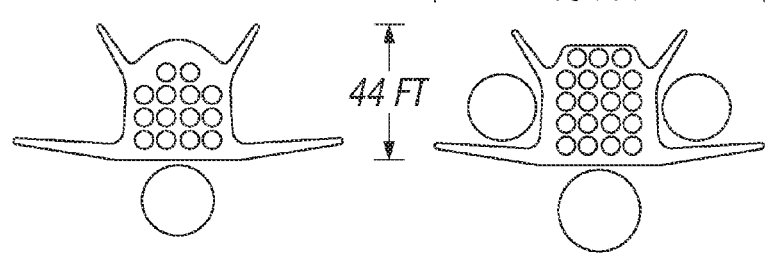
FIG. 4b is a top view of another embodiment of the reusable single-stage global launcher of the present invention with a single payload container and two external fuel tanks.

FIG. 4 shows an embodiment of the reusable global launcher of the present invention having a main tank diameter of 33.0 feet using Saturn 5 main tankage technology heritage and projected DF/DX propulsion technology. Growth to 1½-stage design are as described for FIGS. 2 and 3. Vehicle parameters for this embodiment are listed in Table 4.

TABLE 4

| VEHICLE PARAMETER | SINGLE STAGE | 1½ - STAGE CORE | DROP TANKS (2) |
|---|---|---|---|
| Payload[a] | 373,000 | 735,000 | — |
| Cargo, lbm | 344,500 | 700,700 | — |
| Cargo container, lbm | 28,500 | 34,300 | — |
| Gross liftoff mass, lbm | 7,410,100 | 7,834,800 | 2,731,300 |
| Dry mass less engines, lbm[b] | 361,800 | 382,400 | 109,900 |
| Engines, lbm | | | |
| 14 (SS) or 19 (1.5 S) × DF/DX | 113,778 | 154,473 | — |
| Re-entry planform loading, lbm/ft² | | | |
| Cargo space, ft | 21 × 135 | 25 × 188 | — |
| Cargo density, lbm/ft³ | 6.1 | 7.9 | — |
| Return glide downrange, n.mi. | 11,500 | 11,500 | — |
| Return glide crossrange, n.mi. | ±3,500 | ±3,500 | — |

[a]50 × 100 n.mi.; 28.7°,
[b]incl. 15% margin

FIG. 5 shows the reusable global launchers from FIGS. 2 and 3 compared with reference large aerospace vehicles, including AN-225, currently the world's largest aircraft. Capacities are in Table 5.

TABLE 5

| | REFERENCE HEAVY LAUNCHER | | REUSABLE GLOBAL LAUNCHER CONCEPTS | | REFERENCE AIRCRAFT |
|---|---|---|---|---|---|
| | SATURN 5 1966-1975 (FIG. 5a) | ENERGIA SL-17 1987-1988 (FIG. 5b) | 33 FT. DIA. TANK SINGLE STAGE (FIG. 5c) | 27.5 FT. DIA. TANK 1½ STAGE (FIG. 5d) | AN-225 1992- (FIG. 5e) |
| Payload weight lbm | 250,000[a] | 230,000[b] | 302,000[c] | 318,000[c] | 550,000[e] |
| Gross liftoff wt. lbm | 6,200,000 | 5,357,000 | 7,607,000 | 6,287,000 | 1,250,000 |
| Dry wt. lbm | 435,900 | 497,000 | 507,000 | 436,000[d] | 600,000? |

[a]100 n.mi., 27.8°,
[b]<50 × 100 n.mi., 51.6°;
[c]50 × 100 n.mi., 27.8°,
[d]Incl. drop tanks;
[e]1,500 n.mi. range FIG. 6 shows three smaller reusable global launchers compared with reference aerospace vehicles including Delta IV Heavy, currently the world's largest operational launcher (FIG. 6a). All are 1½-stage, since at these size ranges, single-stage reusable concepts are not credible. These three are: 1) with 16.5 ft. main tank diameter and 2=RD-180 plus 2xSSME engines (FIG. 6b); 2) with 16.5 ft main tank diameter and 5xDF/DX engines (FIG. 6c); 3) with 12.5 ft. main tank diameter and 1xRD-180 plus 1xSSME engines (FIG. 6d). Capacities are listed in Table 6.

TABLE 6

| | REFERENCE | REUSABLE GLOBAL LAUNCHER CONCEPTS | | | REFERENCE |
|---|---|---|---|---|---|
| | LAUNCHER DELTA IV HEAVY 2004- (FIG. 6a) | 16.5 FT. DIA. TANK 1½ STAGE (FIG. 6c) | 16.5 FT. DIA. TANK 1½ STAGE (FIG. 6c) | 27.5 FT. DIA. TANK 1½ STAGE (FIG. 6d) | AIRCRAFT 747-400 ER 1969- (FIG. 6e) |
| Payload weight, lbm | 52,900[a] | 98,000[b] | 158,000[b] | 45,000[b] | 60,740[d] |
| Gross liftoff wt., lbm | 1,632,600 | 2,133,000 | 2,520,000 | 1,043,000 | 910,000 |
| Dry wt., lbm | 170,000 | 156,900[c] | 172,600[c] | 86,400[c] | 406,900 |

[a] 250 n.mi., 28.7°;
[b] 50 × 100 n.mi., 28.7°;
[c] incl. drop tanks;
[d] 6,660 n.mi. range Tables 7-9 list itemized mass and payload estimates for reusable global launchers with main tank diameters 33.0, 27.5, and 16.5 and 12.5 feet respectively, for payloads injected into 50×100 nautical mile UEO. Eighteen design options are presented including single-fuel oxygen/hydrogen, as well as dual-fuel oxygen/hydrocarbon/hydrogen propulsion. In all comparisons, dual-fuel outperforms single-fuel propulsion. Dry mass estimates assume aluminum-lithium orthogrid-stiffened cylindrical tankage and appropriate use of graphite epoxy composite materials in airframe structures. Use of composites in tankage would reduce dry mass and increase vehicle performance.

TABLE 7

Vehicle Mass Estimates (Main Tank Diam: 33 feet)

| | VEHICLE | | | | | |
|---|---|---|---|---|---|---|
| | FULLY REUSABLE (Single Stage) | | | GROWTH WITH O$_2$/H$_2$ DROP TANKS (1½ - Stage) | | |
| WEIGHTS | 8xRD-180 6xSSME $\epsilon$ = 77.5 | 15xSSME $\epsilon$ = 50.0 | 14xDF/ DX | 10xRD-180 6xSSME $\epsilon$ = 77.5 | 19xSSME $\epsilon$ = 50.0 | 19xDF/ DX |
| Tankage | 102,600 | 78,300 | 99,100 | 102,600 | 94,700 | 99,100 |
| Body incl. thrust structure | 62,700 | 42,400 | 63,700 | 65,800 | 57,600 | 68,700 |
| Wing group | 50,600 | 50,600 | 50,600 | 50,600 | 50,600 | 50,600 |
| Tail group | 8,800 | 8,800 | 8,800 | 8,800 | 8,800 | 8,800 |
| Thermal protection system | 46,900 | 46,900 | 46,900 | 46,900 | 46,900 | 46,900 |
| Landing gear | 15,100 | 12,200 | 14,500 | 18,000 | 13,300 | 16,500 |
| Staging/separation systems | 2,100 | 1,100 | 2,500 | 3,000 | 1,700 | 4,000 |
| Elect. pwr/conv/distr systems | 5,800 | 4,500 | 5,800 | 6,000 | 4,500 | 5,800 |
| Surface control activation | 3,000 | 3,000 | 3,000 | 3,000 | 3,000 | 3,000 |
| Avionics | 1,600 | 1,600 | 1,600 | 1,600 | 1,600 | 1,600 |
| Propulsion systems (incl. env. control) | 18,900 | 12,800 | 15,900 | 22,400 | 18,900 | 25,100 |
| Reaction control system | 2,300 | 1,800 | 2,200 | 2,500 | 2,000 | 2,500 |
| Orbit maneuver systems | 0 | 0 | 0 | 0 | 0 | 0 |
| Flight deck/life support/cargo bay | 0 | 0 | 0 | 0 | 0 | 0 |
| Dry weight margin (15%) | 48,060 | 39,600 | 47,190 | 49,600 | 45,540 | 49,890 |
| RD-180 engines | 95,240 | — | — | 119,050 | — | — |
| SSME engines | 43,218 | 101,700 | — | 43,218 | 128,820 | — |
| DF/DX engines | — | — | 113,778 | — | — | 154,473 |
| Main vehicle dry weight | 506,918 | 405,300 | 475,568 | 543,148 | 478,260 | 536,903 |
| Personnel | 0 | 0 | 0 | 0 | 0 | 0 |
| Payload to 50 × 100 n. mi. orbit | 302,000 | 209,500 | 373,000 | 462,000 | 312,000 | 735,000 |
| Reaction control propellants | 11,200 | 9,100 | 10,600 | 11,900 | 10,600 | 11,900 |
| Residual propellants | 12,700 | 9,000 | 12,600 | 12,700 | 9,000 | 12,600 |
| Ascent propellants | | | | | | |
| Oxygen | 5,334,900 | 3,867,429 | 5,302,043 | 5,334,900 | 3,867,429 | 5,302,043 |
| Hydrogen | 468,500 | 644,571 | 480,637 | 468,500 | 644,571 | 480,637 |
| Kerosene (RP-1) | 971,100 | — | — | 971,000 | — | — |
| Propane | — | — | 755,695 | — | — | 755,695 |
| Drop tank inert wt., incl. residuals | — | — | — | 53,684 | 53,000 | 109,900 |

TABLE 7-continued

Vehicle Mass Estimates (Main Tank Diam: 33 feet)

| | VEHICLE | | | | | |
|---|---|---|---|---|---|---|
| | FULLY REUSABLE (Single Stage) | | | GROWTH WITH O$_2$/H$_2$ DROP TANKS (1½ - Stage) | | |
| WEIGHTS | 8xRD-180 6xSSME $\epsilon$ = 77.5 | 15xSSME $\epsilon$ = 50.0 | 14xDF/DX | 10xRD-180 6xSSME $\epsilon$ = 77.5 | 19xSSME $\epsilon$ = 50.0 | 19xDF/DX |
| Drop tank propellants | | | | | | |
| Oxygen | — | — | — | 1,095,601 | 1,104,099 | 2,246,919 |
| Hydrogen | — | — | — | 182,600 | 184,016 | 374,486 |
| Gross liftoff weight (GLOW) | 7,607,218 | 5,144,900 | 7,410,142 | 9,136,033 | 6,662,975 | 10,566,093 |

TABLE 8

Vehicle Mass Estimates (Main Tank Diam: 27.5 feet)

| | VEHICLE | | | | | |
|---|---|---|---|---|---|---|
| | FULLY REUSABLE (Single Stage) | | | GROWTH WITH O$_2$/H$_2$ DROP TANKS (1½ - Stage) | | |
| WEIGHTS | 5xRD-180 3xSSME $\epsilon$ = 77.5 | 9xSSME $\epsilon$ = 50.0 | 8xDF/DX | 7xRD-180 4xSSME $\epsilon$ = 77.5 | 11xSSME $\epsilon$ = 50.0 | 11xDF/DX |
| Tankage | 59,200 | 54,400 | 57,000 | 59,200 | 54,400 | 57,000 |
| Body structure | 44,100 | 31,700 | 36,600 | 51,900 | 38,700 | 50,300 |
| Wing group | 36,000 | 36,000 | 36,000 | 36,000 | 36,000 | 36,000 |
| Tail group | 6,100 | 6,100 | 6,100 | 6,100 | 6,100 | 6,100 |
| Thermal protection system | 32,400 | 32,400 | 32,400 | 32,400 | 32,400 | 32,400 |
| Landing gear | 10,000 | 8,100 | 8,800 | 11,600 | 8,800 | 10,000 |
| Staging/separation systems | 1,200 | 1,000 | 1,500 | 2,400 | 1,500 | 2,400 |
| Elect. pwr/conv/distr systems | 3,300 | 2,600 | 3,200 | 3,300 | 2,600 | 3,200 |
| Surface control activation | 2,100 | 2,100 | 2,100 | 2,100 | 2,100 | 2,100 |
| Avionics | 1,600 | 1,600 | 1,600 | 1,600 | 1,600 | 1,600 |
| Propulsion systems (incl. env. control) | 13,100 | 7,300 | 9,100 | 18,300 | 8,900 | 12,500 |
| Reaction control system | 1,500 | 1,200 | 1,300 | 2,000 | 1,300 | 1,500 |
| Orbit maneuver systems | 0 | 0 | 0 | 0 | 0 | 0 |
| Flight deck/life support/cargo bay | 0 | 0 | 0 | | | 0 |
| Dry weight margin (15%) | 31,590 | 27,675 | 29,355 | 34,035 | 29,160 | 32,265 |
| RD-180 engines | 59,525 | — | — | 83,335 | | — |
| SSME engines | 21,609 | 61,020 | — | 28,812 | 74,580 | — |
| DF/DX engines | — | — | 65,015 | — | — | 89,397 |
| Main vehicle dry weight | 323,324 | 273,195 | 290,070 | 373,082 | 298,140 | 336,762 |
| Personnel | 0 | 0 | 0 | 0 | 0 | 0 |
| Payload to 50 × 100 n. mi. orbit | 158,000 | 80,000 | 197,000 | 318,000 | 158,000 | 398,000 |
| Reaction control propellants | 7,100 | 5,800 | 6,100 | 8,400 | 6,800 | 7,200 |
| Residual propellants | 7,300 | 5,700 | 7,200 | 7,300 | 5,700 | 7,600 |
| Ascent propellants | | | | | | |
| Oxygen | 3,165,195 | 2,222,785 | 3,050,364 | 3,165,195 | 2,222,785 | 3,050,364 |
| Hydrogen | 277,961 | 370,465 | 276,520 | 277,961 | 370,465 | 276,520 |
| Kerosene (RP-1) | 576,093 | — | — | 576,093 | — | — |
| Propane | — | — | 434,766 | — | — | 434,766 |
| Drop tank inert wt., incl. residuals | — | — | — | 62,900 | 32,400 | 64,900 |
| Drop tank propellants | | | | | | |
| Oxygen | — | — | — | 1,284,433 | 661,456 | 1,324,549 |
| Hydrogen | — | — | — | 214,072 | 110,243 | 220,758 |
| Gross liftoff weight (GLOW) | 4,514,973 | 2,957,925 | 4,262,020 | 6,287,436 | 3,865,989 | 6,121,419 |

TABLE 9

Vehicle Mass Estimates (Main Tank Diam: 16.5 & 12.5 feet)

| | MAIN TANK DIAMETER | | | | | |
|---|---|---|---|---|---|---|
| | 16.5 feet Delta IV Heavy Heritage | | | 12.5 feet Atlas V Heritage | | |
| WEIGHTS | 2xRD-180 2xSSME $\in = 77.5$ | 5xSSME $\in = 50.0$ | 5xDF/DX | 1xRD-180 1xSSME $\in = 77.5$ | 3xSSME $\in = 50.0$ | 2xDF/DX |
| Tankage | 14,825 | 13,800 | 14,320 | 6,446 | 6,002 | 6,226 |
| Body structure | 17,540 | 16,500 | 17,720 | 7,956 | 6,984 | 8,475 |
| Wing group | 12,650 | 12,650 | 12,650 | 7,260 | 7,260 | 7,260 |
| Tail group | 2,200 | 2,200 | 2,200 | 1,263 | 1,263 | 1,263 |
| Thermal protection system | 14,725 | 14,725 | 14,725 | 9,500 | 9,500 | 9,500 |
| Landing gear | 3,020 | 3,000 | 2,900 | 2,000 | 1,950 | 2,000 |
| Staging/separation systems | 1,000 | 1,000 | 1,000 | 1,000 | 1,000 | 1,000 |
| Elect. pwr/conv/distr systems | 2,000 | 2,000 | 2,000 | 1,500 | 1,500 | 1,500 |
| Surface control activation | 1,200 | 1,200 | 1,200 | 1,000 | 1,000 | 1,000 |
| Avionics | 1,600 | 1,600 | 1,600 | 1,600 | 1,600 | 1,600 |
| Propulsion systems (incl. env. control) | 2,560 | 2,350 | 2,150 | 1,500 | 1,380 | 1,240 |
| Reaction control system | 1,100 | 1,100 | 1,100 | 1,000 | 1,000 | 1,000 |
| Orbit maneuver systems | 0 | 0 | 0 | 0 | 0 | 0 |
| Flight deck/life support/cargo bay | 0 | 0 | 0 | 0 | 0 | 0 |
| Dry weight margin (15%) | 11,163 | 10,819 | 11,035 | 6,304 | 6,066 | 6,310 |
| RD-180 engines | 23,810 | — | — | 11,905 | — | — |
| SSME engines | 13,560 | 33,900 | — | 7,203 | 20,340 | — |
| DF/DX engines | — | — | 40,635 | — | — | 16,254 |
| Main vehicle dry weight | 122,953 | 116,844 | 125,235 | 67,437 | 66,845 | 64,628 |
| Personnel | 0 | 0 | 0 | 0 | 0 | 0 |
| Payload to 50 × 100 n. mi. orbit | 98,000 | 79,000 | 158,000 | 46,000 | 27,000 | 60,000 |
| Reaction control propellants | 1,500 | 1,500 | 1,500 | 1,000 | 1,000 | 1,000 |
| Residual propellants | 2,000 | 2,000 | 2,000 | 1,500 | 1,500 | 1,500 |
| Ascent propellants | | | | | | |
| Oxygen | 802,216 | 483,214 | 878,835 | 349,005 | 210,102 | 382,118 |
| Hydrogen | 42,343 | 80,536 | 39,655 | 18,301 | 35,017 | 17,242 |
| Kerosene (RP-1) | 210,832 | — | — | 91,723 | — | — |
| Propane | — | — | 150,045 | — | — | 65,240 |
| Drop tank inert wt., incl. residuals | 33,900 | 42,857 | 47,355 | 19,096 | 20,590 | 20,590 |
| Drop tank propellants | | | | | | |
| Oxygen | 692,786 | 846,229 | 966,643 | 389,720 | 420,202 | 420,202 |
| Hydrogen | 115,464 | 141,038. | 161,107 | 64,953 | 70,034 | 70,033 |
| Gross liftoff weight (GLOW) | 2,121,994 | 1,793,218 | 2,530,375 | 1,048,735 | 852,290 | 1,102,553 |

TABLE 10

Summary of reusable global launcher performance in terms of payload and payload: dry mass and payload: gross mass ratios

| | VEHICLE | | | | | |
|---|---|---|---|---|---|---|
| | FULLY REUSABLE Single Stage | | | GROWTH WITH $O_2/H_2$ DROP TANKS (1½ - Stage) | | |
| WEIGHTS | 8xRD-180 6xSSME $\in = 77.5$ | 15xSSME $\in = 50.0$ | 14xDF/DX | 10xRD-180 6xSSME $\in = 77.5$ | 19xSSME $\in = 50.0$ | 19xDF/DX |
| 33 FEET (SATURN 5 MAIN TANKS) | 302 | 209 | 373 | 462 | 312 | 735 |
| | 0.60 | 0.52 | 0.78 | 0.77 | 0.59 | 1.13 |
| | 0.04 | 0.04 | 0.05 | 0.05 | 0.05 | 0.07 |

TABLE 10-continued

Summary of reusable global launcher performance in terms of
payload and payload: dry mass and payload: gross mass ratios

| | VEHICLE | | | | | |
|---|---|---|---|---|---|---|
| | FULLY REUSABLE Single Stage | | | GROWTH WITH $O_2/H_2$ DROP TANKS (1½ - Stage) | | |
| (ENGINES) | 5xRD-180 3xSSME $\in$ = 77.5 | 9xSSME $\in$ = 50.0 | 8xDF/DX | 7xRD-180 4xSSME $\in$ = 77.5 | 11xSSME $\in$ = 50.0 | 11xDF/DX |
| 27.5 FEET (SHUTTLE EXTERNAL TANK) | 158 0.43 0.03 | 80 0.29 0.03 | 197 0.73 0.05 | 318 0.73 0.05 | 158 0.48 0.04 | 398 0.99 0.06 |
| (ENGINES) | | | | 2xRD-180 2xSSME $\in$ = 77.5 | 5xSSME $\in$ = 50.0 | 5xDF/DX |
| 16.5 FEET (DELTA IV) | | MARGINAL OR NOT FEASIBLE | | 98 0.62 0.05 | 79 0.49 0.04 | 158 0.92 0.06 |
| (ENGINES) | | | | 1xRD-180 1xSSME $\in$ = 77.5 | 3xSSME $\in$ = 50.0 | 2xDF/DX |
| 12.5 FEET (ATLAS V) | | NOT FEASIBLE | | 46 0.53 0.04 | 27 0.37 0.03 | 60 0.70 0.05 |

Figure 7A:
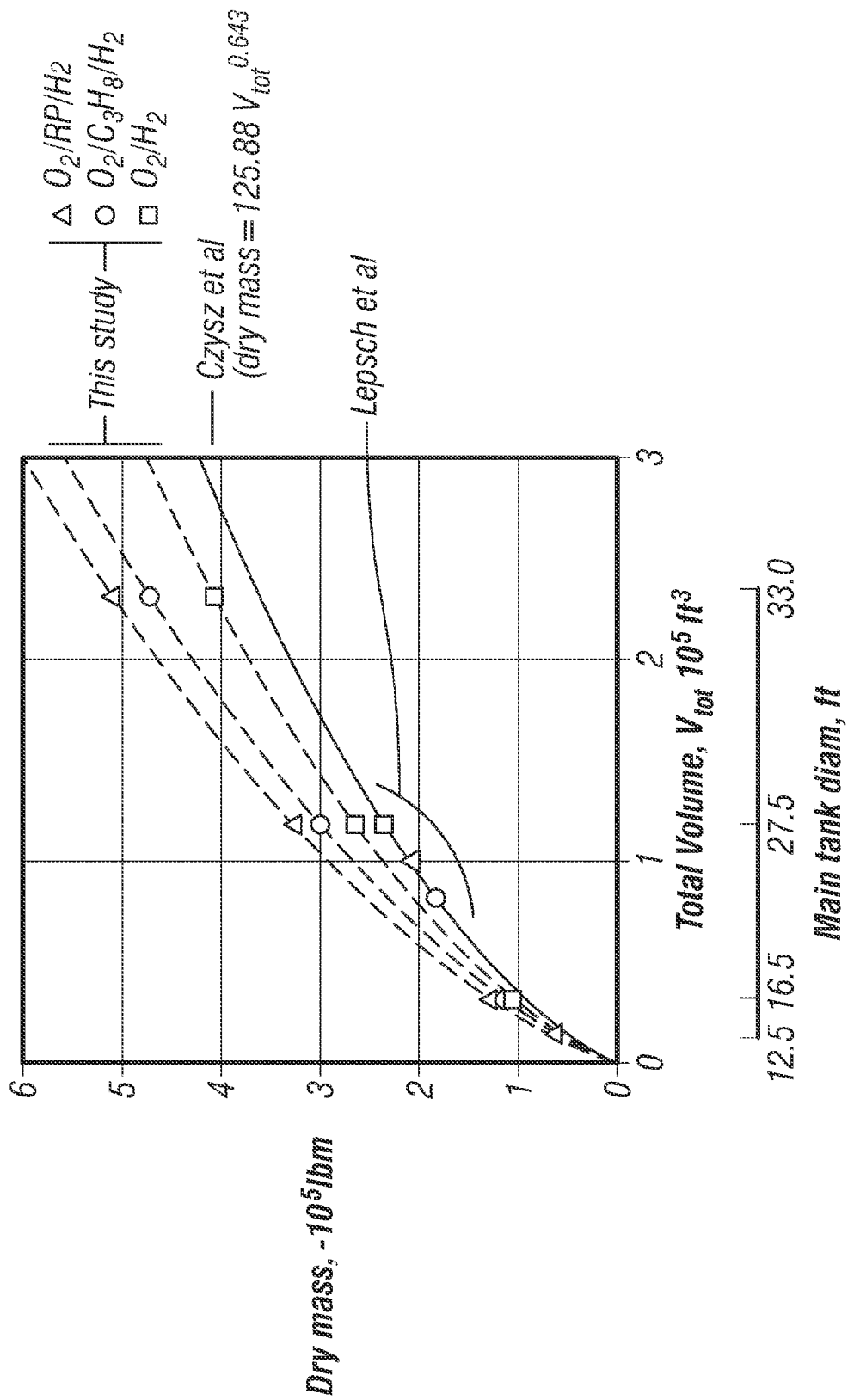
FIG. 7a graphs comparisons of vehicle dry mass estimates of embodiments of the present invention vs. vehicle total estimated volume.
Figure 7B:
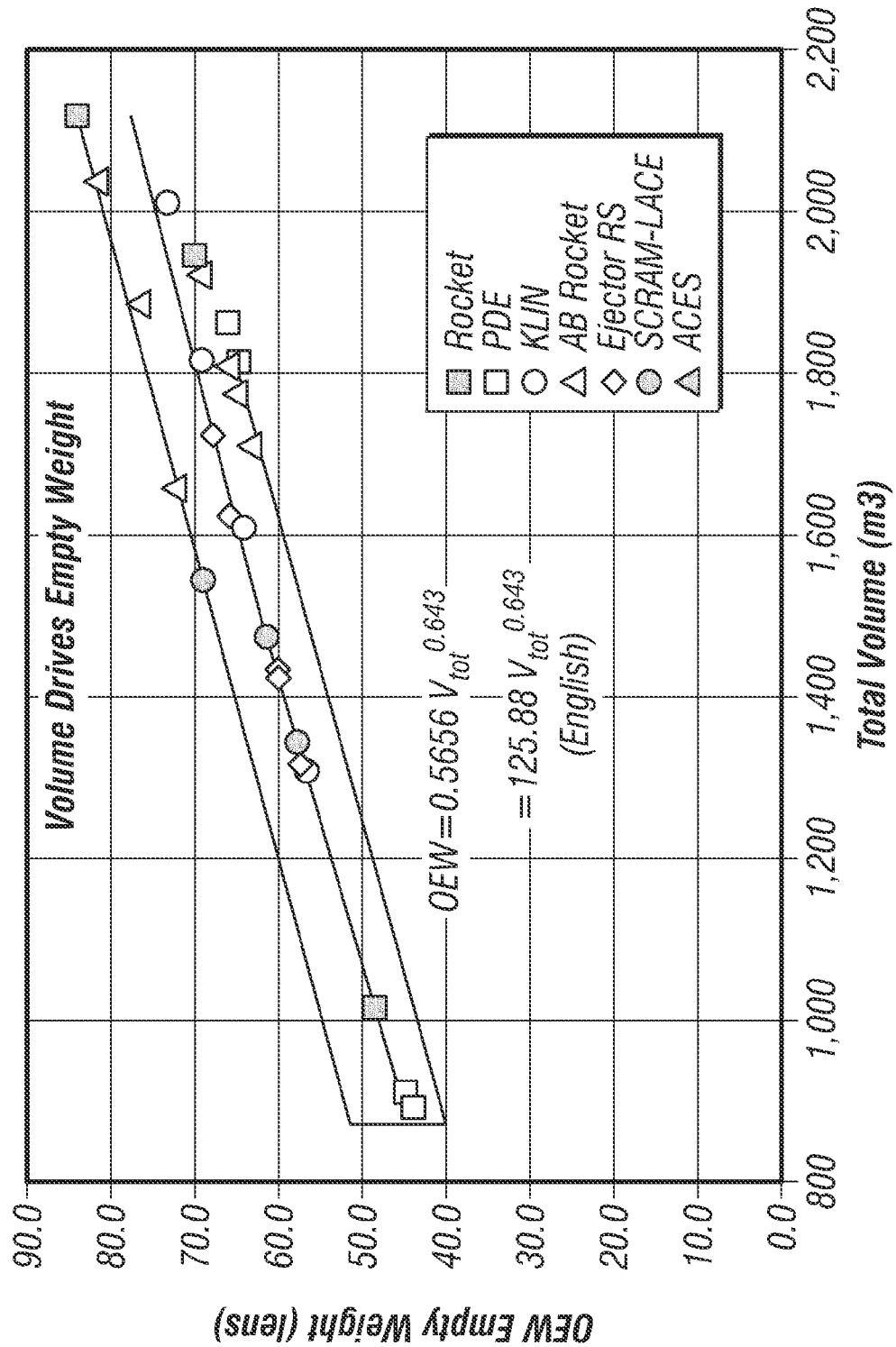
FIG. 7b shows a proposed reference dry mass equation relating vehicle dry mass to total vehicle volume.

Payload to 50 x 100 n.mi. orbit ($10^3$ lbm)
Payload: Dry weight ratio
Payload: Gross weight ratio FIGS. 7a-b shows comparisons of vehicle dry mass scaling. FIG. 7a graphs comparisons of vehicle dry mass estimates of the present invention vs. vehicle total estimated volume, with dry mass estimates of Lepsch, et al. and one proposed equation from Czysz, P. A. and Rahaim, C. P., "Perspective of Launch Vehicle Size and Weight Based on Propulsion System Concept," IAC-02-V.4.08, 53rd IAC, The World Space Congress, 10-19 Oct. 2002, Houston Tex. The comparison shows that the mass estimates of the present invention are 20-30 percent higher (more conservative) than those of Lepsch, et al and Czysz, et al. Accordingly, the vehicle performance estimates of the present invention are considered correspondingly conservative. FIG. 7b shows a proposed reference dry mass equation relating vehicle dry mass to total vehicle volume by Czsyz et al. Metric-to-English conversion is shown.

Figure 8:
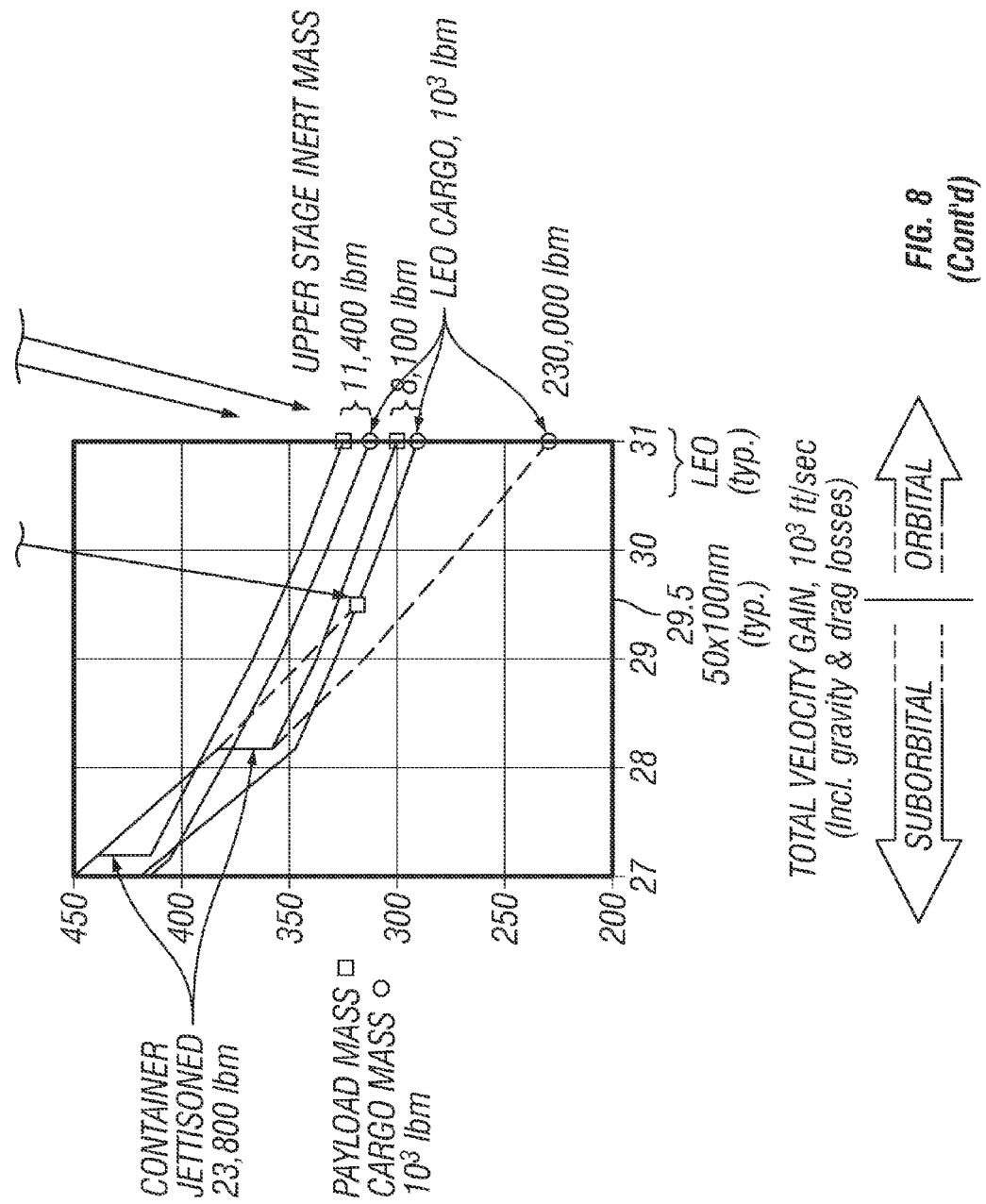
FIG. 8 shows example reusable global launcher (RGL) performance analysis, with and without an upper "kick" stage, for cargo delivery to LEO.

FIG. 8 shows example reusable global launcher (RGL) performance analysis, with and without an upper "kick" stage, for cargo delivery to LEO (main tank diameter 27.5 feet, 1½ stage). Results show LEO cargo increases of 28-36 percent using an existing and an advanced design "kick" stage starting from suborbital velocity and altitude, compared to direct delivery. If vehicle and flight dynamic optimization showed that "kick" stage start and/or container jettison could occur earlier in the trajectory, larger cargo increases would result. In such case, RGL powered flight could continue after staging if necessary to reach a velocity from which glide alone would achieve circum-global return and recovery. For far space missions (i.e., geosynchronous and beyond), direct delivery would be infeasible; larger "kick" stages would be required, but suborbital "kick' stage separation and start would still confer enhanced performance. The Advanced Upper Stage is described in Slazer, Frank A., et al., "Delta IV Launch Vehicle Growth Options to Support NASA's Space Exploration Vision", The Boeing Company, IAC-04-V.4.03, 55th International Astronautical Congress, Vancouver, Canada, 2004.

FIG. 9 depicts use of a reusable global launcher as the Earth launch platform for a geolunar shuttle (using existing engines, with a main tank diameter of 27.5 feet). The shuttle design shown is as disclosed in IAC 05-D2.3.08, "Geolunar Shuttle as Upper Stage for Heavy Earth Launchers", 56th IAC, Fukuoka, Japan, October 2005. Parameters for this embodiment are listed in Table 11.

TABLE 11

| | REUSABLE GLOBAL LAUNCHER | | GEOLUNAR SHUTTLE | |
|---|---|---|---|---|
| VEHICLE PARAMETER | CORE | DROP TANKS (2) | CORE | DROP TANKS (2) |
| Payload capabilities[a], lbm | 318,000 | — | — | — |
| Crew (2), lbm | = | | 500 | = |
| Cargos, Earth→Moon/return, lbm | | | 15,000/5,000 | |
| Gross liftoff mas, lbm | 4,726,000 | 1,561,400 | 162,100 | 155,900 |
| Dry mass less engines[b], lbm | 260,900 | 62,900 | 34,700 | 5,900 |

TABLE 11-continued

| VEHICLE PARAMETER | REUSABLE GLOBAL LAUNCHER | | GEOLUNAR SHUTTLE | |
|---|---|---|---|---|
| | CORE | DROP TANKS (2) | CORE | DROP TANKS (2) |
| Engines, lbm | | | | |
| 7 × RD-180 | 83,335 | — | — | — |
| 4 × SSME (ε = 77.5) | 28,812 | — | — | — |
| 3 × RL10B-2 | — | — | 1,992 | — |
| Re-entry planform loading, lbm/ft² | 30.2 | — | 16.1 | — |
| Cargo bag, ft | — | — | 12 × 30 | — |
| Cargo density, lb/ft³ | — | — | 4.4/1.5 | — |
| Return glide downrange, n.mi. | 11,500 | — | (global) | — |
| Return glide crossrange, n.mi. | ±3,500 | — | ±4,500 | — |

[a] 50 × 100 n.mi., 28.7°;
[b] incl. 15% margin

Figure 10A:
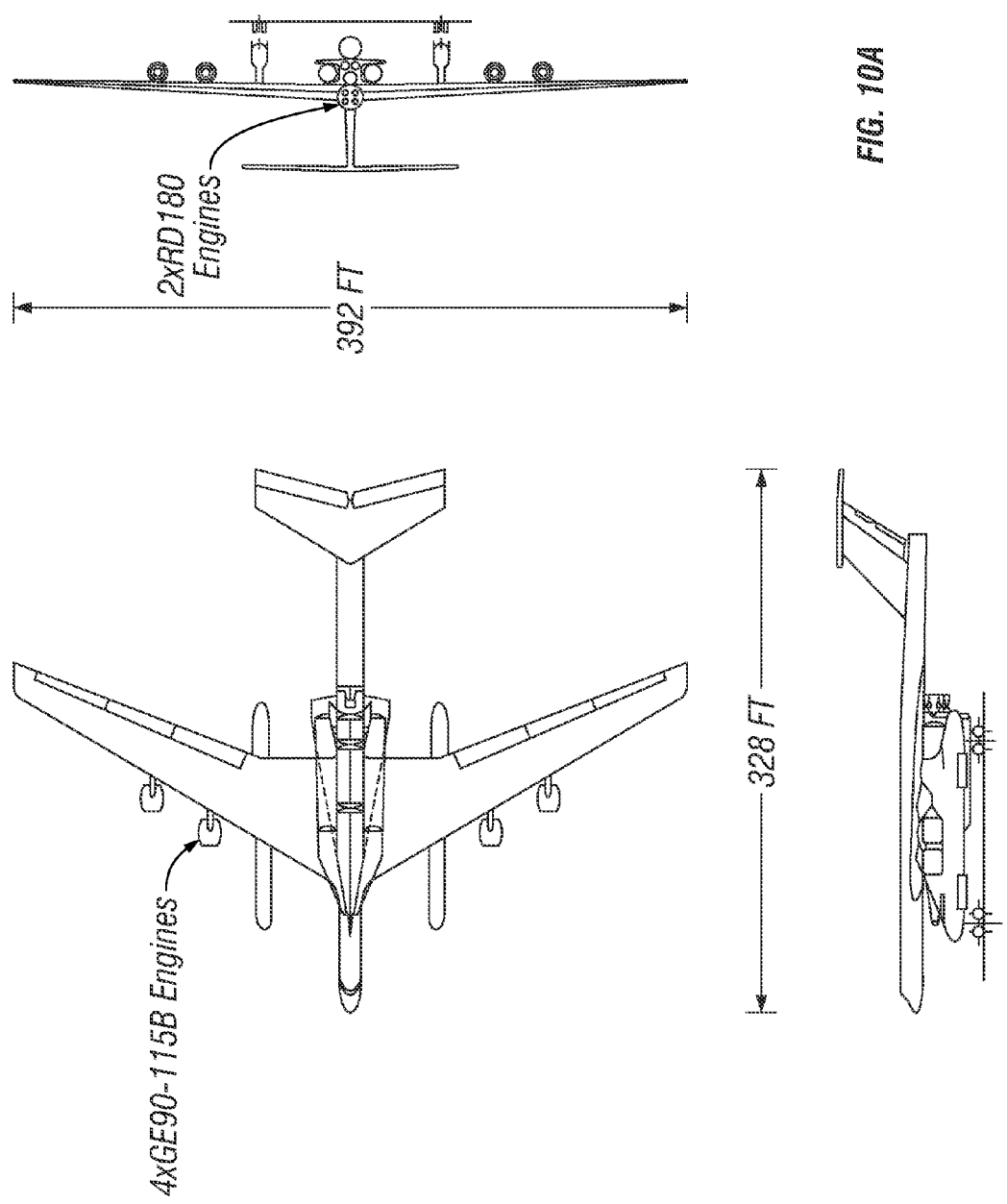
FIG. 10a depicts top, rear, and side views of an embodiment of the reusable global launcher of the present invention suspended from the underside of a specially designed subsonic launch aircraft.
Figure 10B:
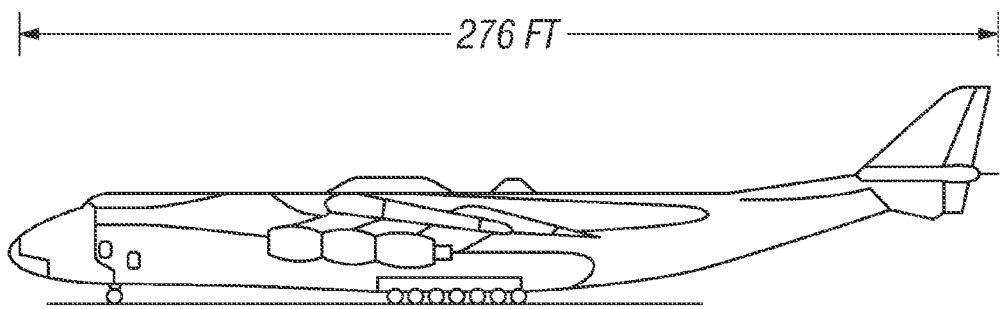
Figure 10C:
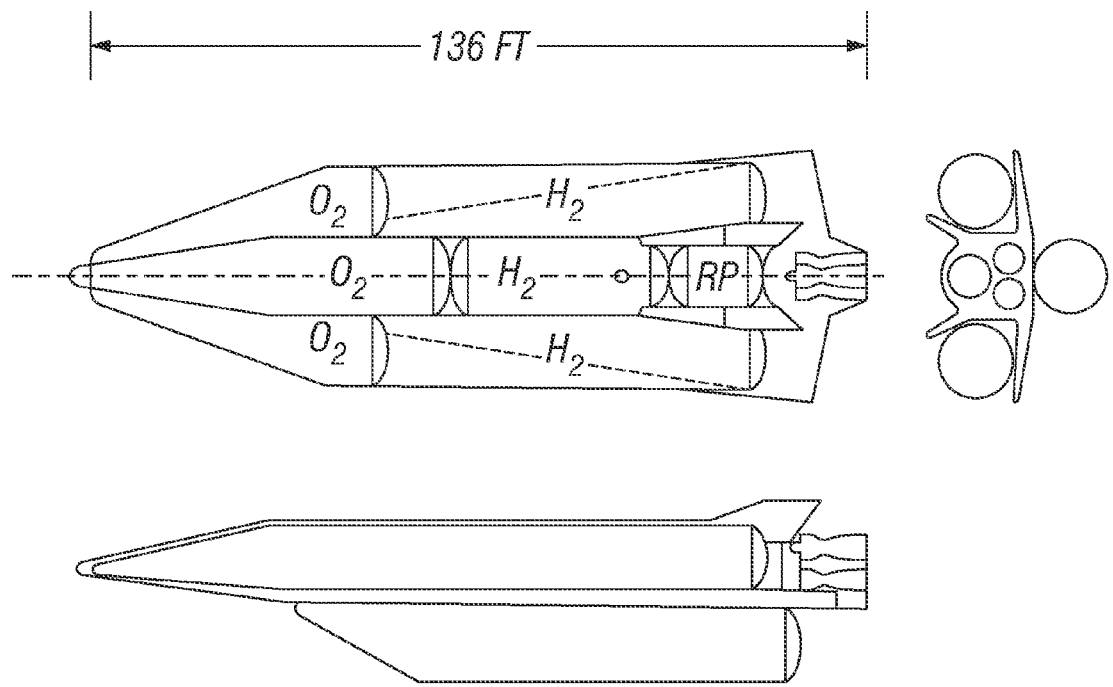

FIG. 10 shows an embodiment of the reusable global launcher of the present invention with subsonic air launch (using existing engines, main tank diameter 12.5 feet). The subsonic launch aircraft design is as disclosed in "Direct Flight Far Space Shuttle", US Patent Application Publication, US2009/0140101, Jun. 4, 2009. Parameters are listed in Table 12.

TABLE 12

| VEHICLE PARAMETER | | REUSABLE GLOBAL LAUNCHER | |
|---|---|---|---|
| | AIRCRAFT | CORE | DROP TANKS |
| Payload[a], lbm | 950,000 | 53,000 | — |
| Cargo, lbm | — | 48,100 | — |
| Cargo container, lbm | — | 4,900 | — |
| Gross start mass, lbm | 1,896,300 | 578,300 | 371,100 |
| Dry mass less engines[b], lbm | 524,040 | 48,329 | 14,900 |
| Engines, lbm | | | |
| 4 × GE-115B (less tailpipe) | 77,260 | — | — |
| 2 × RD-180 | 23,810 | — | — |
| 1 × RD-180 | — | 11,905 | — |
| 1 × SSME(ε = 77.5) | — | 7,203 | — |
| Re-entry planform loading, lbm/ft² | — | 23.6 | — |
| Cargo space, ft | — | 12 × 70 | — |
| Cargo density, lb/ft³ | — | 6.1 | — |
| Return glide downrange, n.mi. | — | (global) | — |
| Return glide crossrange, n.mi. | — | ±3,500 | — |

[a] 50 × 100 n.mi., 28.7°;
[b] incl. 15% margin

Figure 11A:
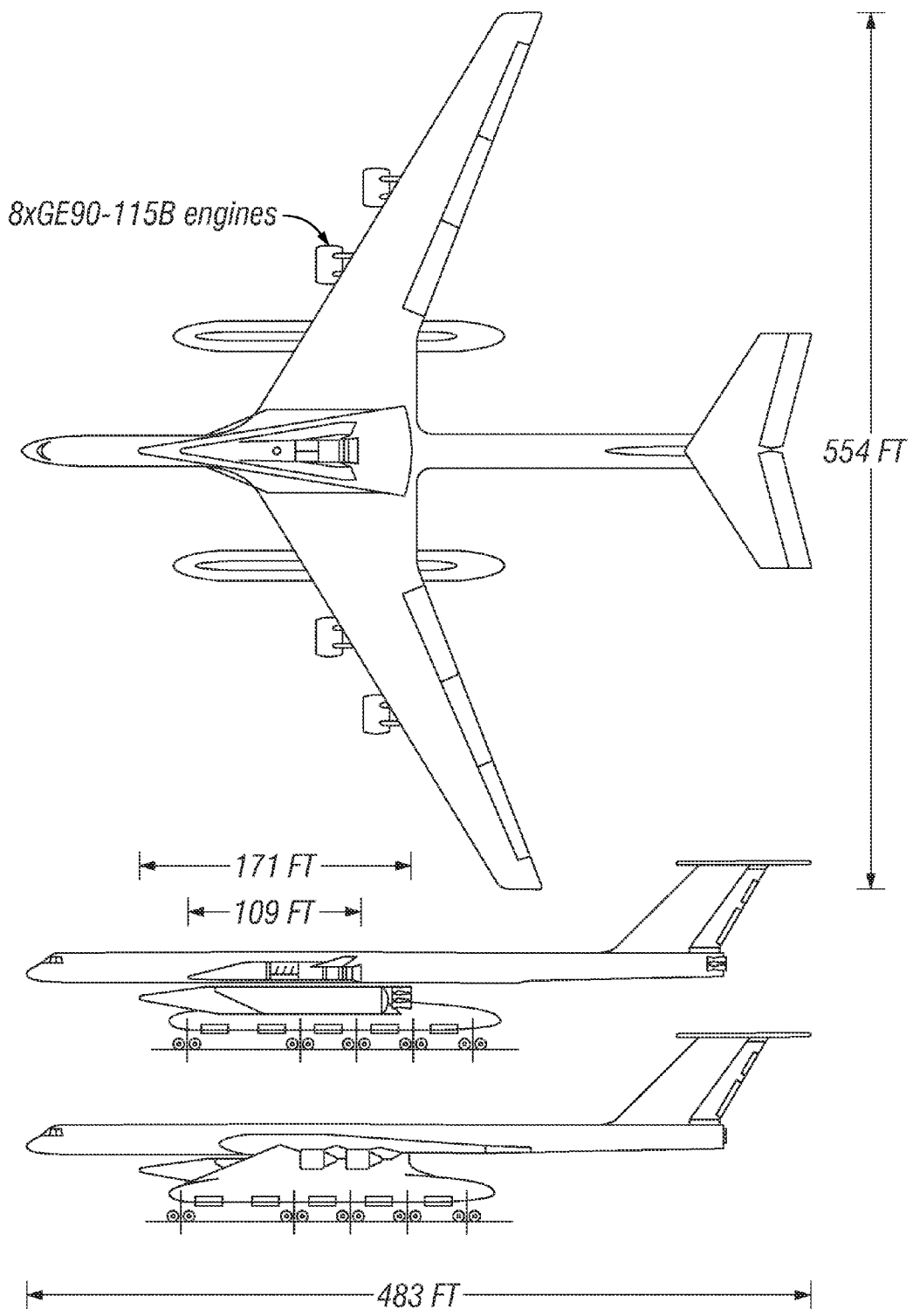
FIG. 11a shows top and side views of another embodiment of a reusable global launcher of the present invention suspended from the underside of another, scaled up subsonic launch aircraft.
Figure 11B:
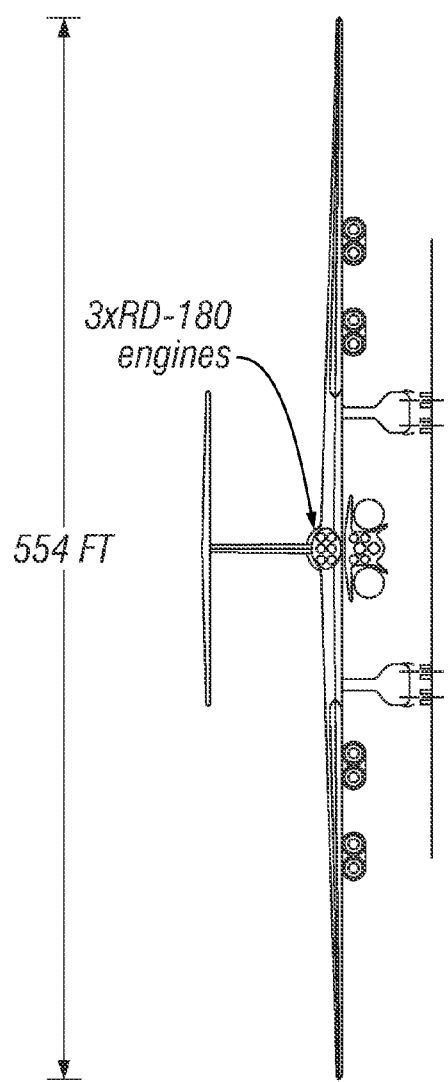
Figure 11C:
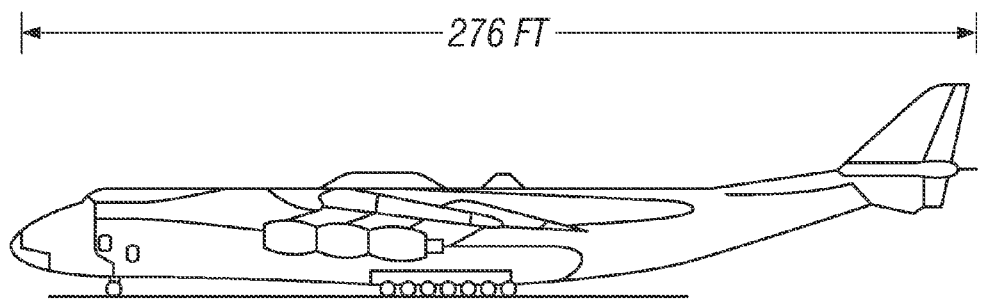

FIG. 11 shows an embodiment of a reusable global launcher with subsonic air launch as the Earth launch platform for a far space shuttle, in this far space mission shown, to perform Earth-low Moon orbit-Earth round-trip with 6 personnel and 10,000 lbm payload (using existing engines, with main tank diameter 16.5 feet). The subsonic launch aircraft design is scaled up from that shown in FIG. 10, and the far space shuttle design is scaled down from that shown in FIG. 9. Deployment of the far space shuttle/reusable global launcher combination is accomplished using a trapeze mechanism to ensure safe separation. This embodiment preferably uses rocket assisted pullup (launch at 60,000 ft. altitude; 45° flight path angle). Parameters are listed in Table 13.

TABLE 13

| VEHICLE PARAMETER | | REUSABLE GLOBAL LAUNCHER | | FAR SPACE SHUTTLE |
|---|---|---|---|---|
| | AIRCRAFT | CORE | DROP TANKS | |
| Nominal payload, lbm | 2,200,000 | 124,000[a] | — | — |
| Crew | ? | — | — | 2,000 (6) |
| Cargo | — | — | — | 10,000[b] |
| Gross liftoff mass, lbm | 4,400,000 | 1,181,844 | 842,150 | 120,587 |
| Dry mass less engines, lbm | 1,217,000 | 85,583[c] | 33,900 | 26,919[c] |
| Engines, lbm | | | | |
| 8 × GE90-115B | 154,520 | — | — | — |
| 3 × RD-180 | 35,715 | — | — | — |
| 2 × RD-180 | — | 23,810 | — | — |
| 2 × SSME(ε = 50) | — | 13,560 | — | — |

TABLE 13-continued

| VEHICLE | | REUSABLE GLOBAL LAUNCHER | | FAR SPACE |
|---|---|---|---|---|
| PARAMETER | AIRCRAFT | CORE | DROP TANKS | SHUTTLE |
| 2 × RL10B-2 | — | — | — | 1,281 |
| Re-entry planform loading, lbm/ft$^2$ | — | 27.2 | — | 11.2 |
| Cargo bay, ft | — | — | — | 12 × 15 |
| Cargo density, lb/ft$^3$ | — | — | — | 5.9 |
| Return glide downrange, n.mi. | — | (global) | — | (global) |
| Return glide crossrange, n.mi. | — | ±3,500 | — | ±4,500 |

[a]50 × 100 n.mi., 28.7°;
[b]Round-Trip: Earth→ low Moon orbit→ Earth;
[c]incl. 15% margin Just as embodiments of the single-stage reusable global launcher (RGL) can be augmented/grown by adding external drop tanks as shown in this study, its performance can also be increased by adding propulsive "strap-on" boosters, often called "zero stages". These can involve liquid, solid or liquid/solid hybrid propulsion. Such strap-on boost stages, with parachute or splash-down recovery, are sometimes termed "reusable", although the amount of re-engineering required especially for salt-water immersion, renders that term questionable.

Development of a reusable propulsive airframe as embodied in some RGL embodiments disclosed herein would provide a basic capability vehicle which can be grown and adapted, or "morphed", to support and perform a range of manned and unmanned missions. For example, if it is large, its liftoff and ascent burn phase can be "human-rated" that it could serve as a reusable Earth launcher for a manned geolunar shuttle as shown in FIG. 9, and support for far space missions such as to Earth-sun libration points, asteroids and Mars. If it is smaller, it could serve as a ground launcher or air-launched launcher for LEO payloads as shown in FIG. 10. It could also be modified as a manned or unmanned single-stage-to-orbit (SSTO) shuttle. In even smaller embodiments it could be air launched from existing aircraft for various global missions.

Embodiments of the present invention include but are not limited to novel combinations of one or more of the following elements: (1) simplicity including: (a) being unmanned, (b) circular cross-section tankage (separate, with no common bulkheads), (c) no internal cargo bay, and/or (d) dry wings; (2) vehicle performance advantages including: (a) dual-fuel propulsion with existing separate single-fuel engines, (b) projected dual-fuel engines; and/or (3) high hypersonic L/D (~3) configuration.

Embodiments of the present invention preferably comprise one or more of following benefits: (1) economics of reusability for all or most of the vehicle hardware; (2) circum-global glide range with aerodynamic maneuverability during ascent as well as re-entry; (3) applicability for a wide range of sizes, including both ground and air launch; (4) adaptability for vehicle performance growth by use of external drop tanks, and liquid, solid or hybrid liquid-solid propulsive "strap-on" boost stages; and/or (5) adaptability for modification to manned operation.

Embodiments of the RGL can be cast as a reusable single-stage boost-glide launcher capable of circum-global glide return to airstrip recovery at its launch site or similar circum-global location. It can be considered a progenitor of eventual SSTO capability when SSTO capability can be guaranteed by real-world reductions in vehicle inert mass, accounting for dry mass, residuals, losses and contingency margins.

Although the invention has been described in detail with particular reference to these embodiments, other embodiments can achieve the same results. Variations and modifications of the present invention will be obvious to those skilled in the art and it is intended to cover all such modifications and equivalents. The entire disclosures of all patents, references, and publications cited above are hereby incorporated by reference.

What is claimed is:

1. A method for operating a launch vehicle, the method comprising the steps of:
   launching a reusable launch vehicle from a launch site;
   boosting the launch vehicle to hypersonic speeds;
   releasing an external vehicle payload from the launch vehicle at an altitude lower than low earth orbit and a velocity lower than orbital velocity at low earth orbit;
   providing a kick stage for propelling the payload to at least low earth orbit;
   the launch vehicle subsequently continuing around the earth at least as far as the launch site by gliding; and
   landing the vehicle.

2. The method of claim 1 wherein the launch vehicle is unmanned.

3. The method of claim 1 wherein the landing step is performed at the same location as the launch step.

4. The method of claim 1 wherein the launching step comprises air launching.

5. The method of claim 1 wherein the launch vehicle comprises sufficient aerodynamic glide capability to circle the Earth.

6. The method of claim 5 wherein a L/D ratio of the launch vehicle is greater than or equal to approximately 3.

7. The method of claim 1 wherein the launch vehicle performs an aerodynamic dog-leg maneuver during ascent prior to the releasing step.

8. The method of claim 1 wherein the launch vehicle comprises a rocket.

9. The method of claim 1 wherein the landing step comprises a landing horizontally on an airstrip.

10. The method of claim 1 wherein the launch vehicle is a single stage vehicle.

11. The method of claim 1 wherein the launch vehicle comprises one or more elements selected from the group consisting of cylindrical propellant tanks, expendable drop tanks, strap on boosters, no internal cargo bay, duel fuel propulsion, circular cross-section, dry wings, and extra engines.

12. The method of claim 11 wherein the expendable drop tanks supply additional fuel to the launch vehicle to increase its payload capacity.

13. The method of claim 1 further comprising the payload entering using its own propulsion to attain low earth orbit and/or destinations beyond low earth orbit.

14. The method of claim 1 comprising reusing the launch vehicle.

15. The method of claim 14 comprising repeating the launching, releasing, performing, and landing steps.

16. The method of claim 1 wherein the payload comprises a geolunar shuttle.

17. The method of claim 16 further comprising the geolunar shuttle traveling to and returning from the moon.

* * * * *